(12) United States Patent
Chen et al.

(10) Patent No.: US 11,245,568 B2
(45) Date of Patent: Feb. 8, 2022

(54) BEAM FAILURE RECOVERY PROCESSING METHOD AND TERMINAL

(71) Applicant: VIVO MOBILE COMMUNICATION CO., LTD., Chang'an Dongguan (CN)

(72) Inventors: Li Chen, Chang'an Dongguan (CN); Xiaodong Sun, Chang'an Dongguan (CN)

(73) Assignee: VIVO MOBILE COMMUNICATION CO., LTD., Chang'an Dongguan (CN)

(*) Notice: Subject to any disclaimer, the term of this patent is extended or adjusted under 35 U.S.C. 154(b) by 106 days.

(21) Appl. No.: 16/608,936

(22) PCT Filed: Apr. 27, 2018

(86) PCT No.: PCT/CN2018/084832
§ 371 (c)(1),
(2) Date: Oct. 28, 2019

(87) PCT Pub. No.: WO2018/196855
PCT Pub. Date: Nov. 1, 2018

(65) Prior Publication Data
US 2021/0105171 A1   Apr. 8, 2021

(30) Foreign Application Priority Data
Apr. 28, 2017   (CN) .......................... 201710297637.5

(51) Int. Cl.
*H04L 12/24* (2006.01)
*H04W 24/04* (2009.01)

(52) U.S. Cl.
CPC ......... *H04L 41/0654* (2013.01); *H04W 24/04* (2013.01)

(58) Field of Classification Search
CPC .......................... H04L 41/0654; H04W 24/04
See application file for complete search history.

(56) References Cited

U.S. PATENT DOCUMENTS

| 9,420,621 | B2 | 8/2016 | Chang et al. |
| 2014/0072078 | A1 | 3/2014 | Sergeyev et al. |
| 2015/0215077 | A1 | 7/2015 | Ratasuk et al. |
| 2016/0150591 | A1 | 5/2016 | Mehrabani et al. |
| 2016/0190686 | A1 | 6/2016 | Gao et al. |
| 2016/0192433 | A1 | 6/2016 | Deenoo et al. |

(Continued)

FOREIGN PATENT DOCUMENTS

| CN | 103718591 A | 4/2014 |
| CN | 104509148 A | 4/2015 |

(Continued)

OTHER PUBLICATIONS

1st Chinese Office Action for Chinese Application No. 201710297637.5, dated Jun. 5, 2019 (Jun. 5, 2019)—8 pages (English translation—8 pages).

(Continued)

*Primary Examiner* — Jung H Park
(74) *Attorney, Agent, or Firm* — Culhane Meadows PLLC; Stephen J. Weed

(57) ABSTRACT

A beam failure recovery processing method and a terminal are provided. The method is applied to the terminal and includes: triggering a beam failure recovery; and determining whether the beam failure recovery succeeds or not.

17 Claims, 10 Drawing Sheets

(56) References Cited

U.S. PATENT DOCUMENTS

| | | | | |
|---|---|---|---|---|
| 2018/0006770 | A1* | 1/2018 | Guo | H04L 1/1835 |
| 2018/0192371 | A1* | 7/2018 | Jung | H04B 7/0617 |
| 2018/0227899 | A1* | 8/2018 | Yu | H04B 7/02 |
| 2020/0014453 | A1* | 1/2020 | Takeda | H04L 5/006 |
| 2020/0067589 | A1* | 2/2020 | Jeong | H04W 24/10 |
| 2020/0275514 | A1* | 8/2020 | Takahashi | H04W 72/0453 |

FOREIGN PATENT DOCUMENTS

| | | |
|---|---|---|
| CN | 105210444 A | 12/2015 |
| CN | 107567038 A | 1/2018 |
| CN | 104641569 A | 6/2018 |

OTHER PUBLICATIONS

Chinese Search Report for Chinese Application No. 201710297637. 5, dated Apr. 25, 2019 (Apr. 25, 2019)—5 pages (English translation—3 pages).

Extended European Search Report for European Application No. 18791338.9, dated Mar. 19, 2020 (Mar. 19, 2020)—9 pages.

Guangdong OPPO Mobile Telecom, "On Beam Recovery Mechanism," 3GPP TSG RAN WG1 Meeting #88, R1-1701944, Athens, Greece, Feb. 13, 2017, 6 pages.

Huawei, HiSilicon, "Link recovery procedure for Beam Failure," 3GPP TSG RAN WG1 Meeting #88b, R1-1704230, Spokane, US, Apr. 3, 2017, 8 pages.

International Search Report and Written Opinion for International Application No. PCT/CN2018/084832, dated Nov. 7, 2019 (Nov. 7, 2019)—13 pages (English translation—10 pages).

MediaTek et al.: "WF on Beam Failure Recovery," 3GPP TSG RAN WG1 Meeting #88b, R1-1706633, Spokane, US, Apr. 3, 2017, 6 pages.

Nokia, Alcatel-Lucent Shanghai Bell, "Beam Recovery in NR" 3GPP TSG-RAN WG2 NR Adhoc, R2-1700075, Spokane, US, Jan. 17, 2017, 5 pages.

Samsung: "Discussion on recovery from beam failure," 3GPP TSG RAN WG1 Meeting #88bis, R1-1705343, Spokane, US, Apr. 3, 2017, 6 pages.

Samsung: "Discussions on Beam Recovery," 3GPP TSG RAN WG1 #86bis, R1-1609081, Lisbon, Portugal, Oct. 10, 2016, 3 pages.

Vivo, "Discussion on Beam Recovery," 3GPP TSG RAN WG1 Meeting #88, R1-1703389, Athens, Greece, Feb. 13, 2017, 5 pages.

Vivo, "Discussion on Beam Recovery," 3GPP TSG RAN WG1 Meeting #88bis, R1-1704489, Spokane, Washington, US, Apr. 3, 2017, 5 pages.

ZTE, ZTE Microelectronics: "Discussion on Beam Recovery Mechanism," 3GPP TSG RAN WG1 Meeting #88, R1-170803, Athens, Greece, Feb. 13, 2017, 6 pages.

* cited by examiner

BEAM FAILURE RECOVERY PROCESSING METHOD AND TERMINAL

CROSS-REFERENCE TO RELATED APPLICATION

This application is a U.S. national phase application of a PCT Application No. PCT/CN2018/084832 filed on Apr. 27, 2018, which claims a priority of the Chinese patent application No. 201710297637.5 filed in China on Apr. 28, 2017, a disclosure of which is incorporated herein by reference in its entirety.

TECHNICAL FIELD

The present disclosure relates to the field of communication technology, and in particular relates to a beam failure recovery processing method and a terminal.

BACKGROUND

Researches on a next generation communication system beyond a fourth generation (4G) mobile communication system desire to enlarging an operating frequency band supported by the communication system to 6 GHz and above, up to about 100 GHz. Higher frequency bands have more abundant unoccupied frequency resources and may provide greater throughput for data transmission. Currently, the 3GPP (the 3rd Generation Partnership Project) has finalized modeling for high frequency channels. Compared with low frequency bands, more antenna array elements may be arranged on a same panel, owing to a shorter wavelength of a high frequency signal, such that beams with better directivity and narrower lobes may be formed by beamforming.

Since a wavelength of the high frequency signal is shorter in a high-frequency-band communication system, conditions such as signal propagation being blocked are prone to occur, causing signal transmission to be discontinued. If radio link re-establishment in related art is employed, significantly more time will be needed. As a result, a beam failure recovery mechanism is introduced, i.e., a terminal monitors at physical layer a beam failure detection reference signal transmitted by a base station and assesses whether a quality of the beam failure detection reference signal meets a beam failure trigger condition. Once the condition is met, the terminal may transmit to the base station a beam failure recovery request. Based on the beam failure recovery request, the base station determines a new candidate transmission beam for used by control information or data transmission. The beam failure recovery mechanism enables the communication system to switch rapidly to a spare beam pair link (BPL) and resume transmission of control message and data transmission, thereby achieving beam failure recovery. The spare BPL includes the aforementioned new candidate transmission beam and a reception beam.

However, in actual data transmission recovery processes, the beam failure recovery mechanism in the related art may suffer from a problem of a large transmission latency.

SUMMARY

The present disclosure provides a beam failure recovery processing method and a terminal.

In a first aspect, some embodiments of the present disclosure provide a beam failure recovery processing method. The method is applied to a terminal and includes: triggering a beam failure recovery; and determining whether the beam failure recovery succeeds or not.

In a second aspect, some embodiments of the present disclosure provide a terminal. The terminal includes: a trigger module, configured to trigger a beam failure recovery; and a first determination module, configured to determine whether the beam failure recovery succeeds or not.

In a third aspect, some embodiments of the present disclosure provide a terminal. The terminal includes: a processor and a storage configured to store a program. The processor is configured to call the program stored in the storage to implement the method according to the first aspect of the present disclosure.

In a fourth aspect, some embodiments of the present disclosure provide a terminal. The terminal includes at least one processing element or processing chip configured to implement the method according to the first aspect of the present disclosure.

In a fifth aspect, some embodiments of the present disclosure provide a computer program. The computer program is configured to be executed by a computer processor to implement the method according to the first aspect of the present disclosure.

In a sixth aspect, some embodiments of the present disclosure provide a computer program product, e.g. a non-volatile computer readable storage medium, which includes the computer program according to the fifth aspect of the present disclosure.

In a seventh aspect, some embodiments of the present disclosure provide a non-volatile computer readable storage medium including instructions stored thereon. When the instructions are executed by a computer, the computer implements the method according to the first aspect of the present disclosure.

As such, in the embodiments of the present disclosure, by triggering a beam failure recovery and further determining whether the beam failure recovery succeeds or not, a radio link is recovered rapidly in case of a beam failure or beam recovery failure, thereby improving reliability of data transmission and reducing a latency of data transmission.

BRIEF DESCRIPTION OF THE DRAWINGS

To better clarify technical solutions of some embodiments of the present disclosure or related art, drawings used in description of the embodiments or related art will be briefly introduced hereinafter. Apparently, the described drawings merely illustrate some of the embodiments of the present disclosure. A person of ordinary skills in the art may obtain other drawings based on the described drawings without any creative efforts.

DETAILED DESCRIPTION

To make a technical problem to be solved, a technical solution and advantages of some embodiments of the present disclosure clearer, the technical solution in some embodiments of the present disclosure will be described clearly and completely hereinafter with reference to the accompanying drawings in the embodiments of the present disclosure. It is apparent that the embodiments in the following description are merely a part, rather than all, of the embodiments of the present disclosure. All other embodiments obtained by a person of ordinary skills in the art based on the embodiments of the present disclosure without paying creative efforts shall fall within the scope of the present disclosure.

Terms "comprise," "include," "have" and any variations thereof in the specification and claims of the present disclosure are intended to cover a non-exclusive inclusion meaning, such that a process, a method, a system, a product or a device that includes a list of steps or elements not only includes the list of steps or elements clearly listed, but also may include other steps or elements not expressly listed or include steps or elements inherent to the process, the method, the product, or the device.

The beam failure recovery processing method and the terminal provided by the present disclosure may address the problem of related art that the beam failure recovery mechanism in actual data transmission recovery processes has a large data transmission latency.

Figure 1:
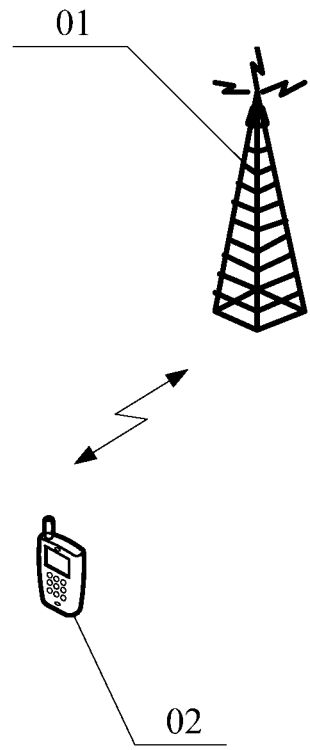
FIG. 1 is a schematic architectural diagram of a beam failure recovery system provided by the present disclosure.

The beam failure recovery processing method and the terminal provided by the present disclosure may be applied to a beam failure recovery system having an architecture as shown in FIG. 1. As shown in FIG. 1, the system may include a network-side device 01 and a terminal 02.

The network-side device 01 may be a Base Transceiver Station (BTS, for short) in a Global System of Mobile communication (GSM) or a Code Division Multiple Access (CDMA), or a NodeB (NB, for short) in a Wideband Code Division Multiple Access (WCDMA, for short), or an Evolutional Node B (eNB or eNodeB, for short) in a Long Term Evolution (LTE), or a relay station or an access point, or a base station in a future 5G network, etc., which is not limited herein.

The terminal 02 may be a wireless terminal or a wired terminal. The wireless terminal may refer to a device used to provide a user with data connectivity of voice and/or other services, a hand-held device with wireless connection function being enabled, or other processing devices connected to a wireless modem. The wireless terminal may communicate with one or more core networks via a Radio Access Network (RAN). The wireless terminal may be a mobile terminal, such as a mobile telephone (or referred to as a "cellular" phone) or a computer with a mobile terminal, such as a portable, pocket-sized, hand-held, computer built-in, or in-vehicle mobile apparatus, which exchanges voice and/or data with the wireless access network. For example, the wireless terminal may be a Personal Communication Service (PCS, for short) telephone, a Session Initiation Protocol (SIP) telephone, a Wireless Local Loop (WLL, for short) station, or a Personal Digital Assistant (PDA, for short). The wireless terminal may also be referred to as a system, a Subscriber Unit, a Subscriber Station, a Mobile Station, a Mobile, a Remote Station, a Remote Terminal, an Access Terminal, a User Terminal, a User Agent, or a User Device or User Equipment, which is not limited herein.

Since a wavelength of a radio signal is shorter in a high-frequency-band communication system, conditions such as signal propagation being blocked are prone to occur, causing a signal transmission being discontinued. If a radio link re-establishment mechanism (or a radio link recovery mechanism) in related art is employed, significantly more time will be needed. As a result, a beam failure recovery mechanism is introduced, i.e., in a case that a terminal monitors a quality of a beam failure detection reference signal transmitted by a base station meets a beam failure trigger condition, the terminal transmits to the base station a beam failure recovery request. Based on the beam failure recovery request, the base station determines a new candidate transmission beam to resume transmission of control information or data transmission, thereby achieving beam failure recovery.

Based on the beam failure recovery mechanism, the present disclosure provides a beam failure recovery processing method and a terminal, so that a radio link may be recovered rapidly, thereby improving reliability of data transmission.

Before the embodiments of the present disclosure are described, an explanation of professional terms used in the present disclosure is provided.

Radio link failure (RLF, for short): during a radio link monitoring (RLM, for short) process, a terminal assesses a downlink radio quality of each frame, e.g., a channel quality of a Physical Downlink Control Channel (PDCCH, for short), and compares the quality against thresholds $Q_{in}$ and $Q_{out}$ (these thresholds are inherent to the terminal and identified by the terminal through test). When the downlink radio quality is lower than the $Q_{out}$, a physical layer of the terminal indicates an "out-of-sync" to a higher layer of the terminal; and when the downlink radio quality is higher than the $Q_{in}$, the physical layer of the terminal indicates an "in-sync" to the higher layer of the terminal. Based on the "out-of-sync" indication, the higher layer of the terminal declares a RLF monitoring process. A recovery process for the RLF is a Radio Resource Control (RRC) re-establishment.

Beam Pair Link (BPL, for short): the BPL includes a transmission beam and a reception beam. The BPL may be configured to carry a control channel, e.g., a PDCCH or a data channel, e.g., a Physical Downlink Shared Channel (PDSCH, for short).

BPL employed in current transmission: the BPL employed in the current transmission refers to a transmission beam and a reception beam employed during transmission and reception of control information or data. In downlink data transmission, the BPL being employed currently is a downlink BPL which includes a transmission beam employed by the network-side device to transmit control information or data and a reception beam employed by the terminal to receive data and control information. In an uplink data transmission, the BPL being employed currently is an uplink BPL which includes a transmission beam employed by the terminal to transmit data and a reception beam employed by the network-side device to receive data. In the present disclosure, the BPL employed in the current transmission is a downlink BPL.

The technical solutions of the present disclosure and how the technical solutions solve the aforementioned technical problems are described in detail in the specific embodiments hereinafter. The specific embodiments described hereinafter may be integrated with each other, and same or similar concepts or processes may be omitted in the description of some embodiments. The embodiments of the present disclosure are described hereinafter with reference to the accompanying drawings.

Figure 2:
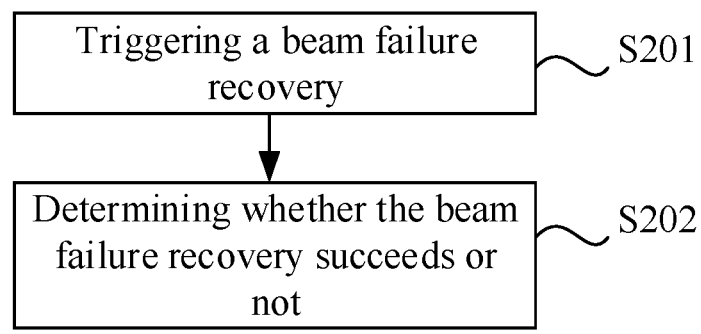
FIG. 2 is a schematic flow diagram of an example of a beam failure recovery processing method provided by the present disclosure.

FIG. 2 is a schematic flow diagram of an example of a beam failure recovery processing method provided by the present disclosure. The method as shown in FIG. 2 relates to a process of performing a beam failure recovery by a terminal in case of a beam failure. The method is implemented by a terminal. As shown in FIG. 2, the method includes following steps S201 to S202.

S201: triggering a beam failure recovery.

In specific, during a downlink data transmission process, the terminal monitors in real time a quality of a Beam Pair Link (BPL, for short) employed in the current information transmission. The BPL is a downlink BPL. Optionally, the terminal may determine the quality of the BPL employed in the current information transmission by detecting a signal-noise ratio (SNR) or a reception power of a reference signal on the BPL employed in the current information transmission.

After acquiring the quality of the BPL employed in the current information transmission, the terminal determines whether the quality of the BPL employed in the current information transmission meets a preset beam failure trigger condition. If the condition is met, the terminal starts a beam failure recovery processing process, that is, the beam failure recovery processing process is triggered thence.

Optionally, the preset beam failure trigger condition may include a preset reference threshold. When the quality, measured by the terminal, of the BPL employed in the current information transmission is lower than or equal to the preset reference threshold, the terminal determines that the quality of the BPL employed in the current information transmission is poor and triggers a beam failure recovery.

Optionally, the preset beam failure trigger condition may include a preset reference threshold and stipulate that the quality of the BPL employed in the current information transmission is lower than or equal to the preset reference threshold for at least one time. When the quality, measured by the terminal, of the BPL employed in the current information transmission is lower than or equal to the preset reference threshold for at least one time, the terminal determines that the quality of the BPL employed in the current information transmission is poor, thereby triggering a beam failure recovery.

Subsequently, the terminal transmits a beam failure recovery request to a network-side device, e.g., a base station. Optionally, the beam failure recovery request may include a candidate BPL recommended by the terminal, and the candidate BPL may be another candidate BPL other than the BPL employed in the current information transmission, in a beam report when the beam training is performed, or may be a BPL in a non-beam report acquired by the terminal by other means. Optionally, the beam failure recovery request may also carry a parameter related to restarting a beam search, a type of causes of beam failure, such as a movement of a terminal, a rotation of a terminal or a beam being blocked, etc.

Optionally, the terminal may transmit the beam failure recovery request on resources allocated by a higher layer or on reserved dedicated resources. The beam failure recovery request may be transmitted by using an uplink narrow beam or wide beam acquired from the beam training, and may be transmitted in rotation by means of UL beam sweeping, or may be transmitted by using a low-frequency-band radio signal.

It may be seen from the above description that the beam failure trigger condition may be implemented in various manners, thereby enhancing diversity of ways in which the terminal triggers the beam failure recovery.

S202: determining whether the beam failure recovery succeeds or not.

In specific, after the terminal transmits the beam failure recovery request to the network-side device, the terminal waits to receive a Beam failure recovery Response transmitted by the network-side device corresponding to the beam failure recovery request. Here, three situations may occur as follows. A first condition: the network-side device missed the beam failure recovery request transmitted by the terminal, therefore the network-side device never transmits the response directed to the beam failure recovery request; a second condition: the network-side device receives the beam failure recovery request transmitted by the terminal and transmits the response directed to the beam failure recovery request, but the terminal fails to receive the response; a third condition: the network-side device receives the beam failure recovery request transmitted by the terminal and transmits the response directed to the beam failure recovery request, and the terminal successfully receives the response directed to the beam failure recovery request.

As an illustrative example, the response may include a response configured to indicate a success of a beam failure recovery, or a response configured to indicate a failure of the beam failure recovery. The response configured to indicate the success of the beam failure recovery may specifically be a positive acknowledgment (e.g., ACK), and the response configured to indicate the failure of the beam failure recovery may specifically be a negative acknowledgment (e.g., NACK).

It should be noted that, the response transmitted by the network-side device to the terminal after the network-side device receives the beam failure recovery request may include a signaling content regarding switching to a spare BPL, or a signaling content regarding parameters related to restarting the beam searching so as to look for an available spare BPL for resuming data transmission. Further, when the network-side device is transmitting the response, the network-side device may use another BPL acquired through the beam training, other than the BPL employed in the current information transmission, or the network-side device may use a wide beam encompassing the BPL employed in the current information transmission, or the network-side device may use a DL beam sweeping for transmission in rotation, or the network-side device may use a low-frequency-band radio signal. Of course, in the case that the network-side device fails to receive the beam failure recovery request transmitted by the terminal, the network-side device keeps transmitting a control channel and a data channel on the BPL employed in the current information transmission.

Further, when the terminal is receiving the response transmitted by the network-side device, the terminal may receive the response on the BPL employed by the current information transmission, or may receive the response on a candidate BPL acquired through the beam training, other than the BPL employed in the current information transmission, or may receive the response on a wide beam encompassing the BPL employed in the current information transmission, or may receive the response through the DL beam sweeping, or may receive the response through a low-frequency-band radio signal, which is not limited by the embodiments of the present disclosure.

In the case that the terminal fails to receive the response transmitted by the network-side device within a preset time duration, the terminal continues to transmit to the network-side device the beam failure recovery request according to a preset period, and so on.

The terminal determines whether the beam failure recovery is successful or not based on reception or non-reception of the response by the terminal and based on the content of the received response. It is obvious that in a case that the terminal receives the response configured to indicate a success of the beam failure recovery, the beam failure recovery is successful; and in a case that the terminal receives the response configured to indicate the failure of the beam failure recovery, the beam failure recovery fails.

As may be seen from the description of the step S202, the terminal may determine whether the beam failure recovery succeeds or not according to the content of the received response transmitted by the network-side device, thus a manner of determining whether the beam failure recovery is successful or not is simple and efficient, such that the terminal may resume data transmission timely in case of a beam failure.

The beam failure recovery processing method provided by the present disclosure triggers the beam failure recovery and further determines whether the beam failure recovery succeeds or not, and in case of a beam failure or a failure of the beam failure recovery, recovers a radio link rapidly, thereby improving data transmission reliability and reducing data transmission latency.

The above embodiments describe the manner in which the terminal may triggers the beam failure recovery. The manner of triggering the beam failure recovery is described next, with reference to several optional manners as follow.

Figure 3:
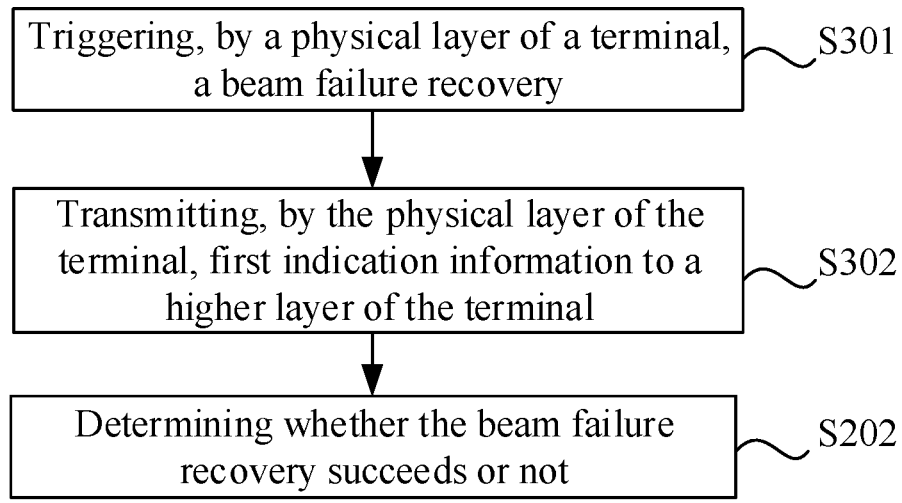
FIG. 3 is a schematic flow diagram of an example of the beam failure recovery processing method provided by the present disclosure.

FIG. 3 is a schematic flow diagram of an example of the beam failure recovery processing method provided by the present disclosure. Referring to FIG. 3, on the basis of the process as shown in FIG. 2, the step S201 may include the following sub-steps S301 to S302.

S301: triggering, by a physical layer of the terminal, the beam failure recovery.

Optionally, the physical layer of the terminal may determine, by using the method of the foregoing embodiments, e.g., by using the quality of the BPL employed in the current information transmission and a preset beam failure trigger condition, to trigger the beam failure recovery, thus the manner of the determination is simple and the efficiency of triggering the beam failure recovery is high.

S302: transmitting, by the physical layer of the terminal, first indication information to a higher layer of the terminal.

The first indication information is configured to indicate that the beam failure recovery has been triggered by the physical layer of the terminal, or the first indication information is configured to indicate that the beam failure recovery will be triggered by the physical layer of the terminal after a preset time duration.

In another word, the physical layer of the terminal may trigger a beam failure recovery and transmit the first indication information to the higher layer of the terminal prior to or subsequent to the triggering of the beam failure recovery, so as to notify the higher layer of the terminal of information, that is, the first indication formation, regarding the triggering of the beam failure recovery, thereby enabling information intercommunication between the physical layer and the higher layer of the terminal and as a result, a related operation of the higher layer may be affected, such as scheduling, access control, RLF, and the like.

Figure 4:
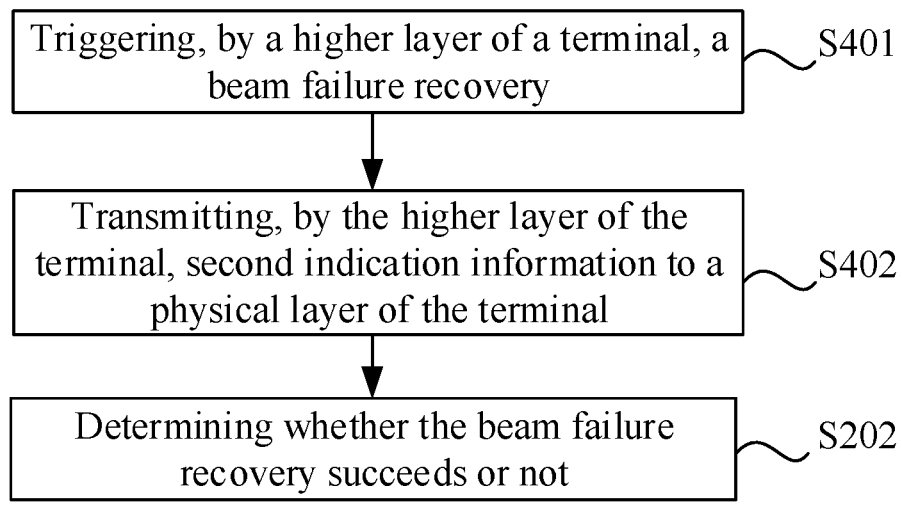
FIG. 4 is a schematic flow diagram of an example of the beam failure recovery processing method provided by the present disclosure.

FIG. 4 is a schematic flow diagram of an example of the beam failure recovery processing method provided by the present disclosure. Referring to FIG. 4, on the basis of the process as shown in FIG. 2, the step S201 may include the following sub-steps S401 to S402.

S401: triggering, by a higher layer of the terminal, the beam failure recovery.

S402: transmitting, by the higher layer of the terminal, second indication information to a physical layer of the terminal.

The second indication information is configured to indicate that the beam failure recovery has been triggered by the higher layer of the terminal, or the second indication information is configured to instruct the physical layer of the terminal to perform the beam failure recovery.

This implementation differs from the foregoing implementation in that, in this implementation, the higher layer of the terminal triggers the beam failure recovery and notifies the physical layer of the terminal of information, i.e., the second indication information, regarding the triggering of the beam failure recovery.

In this implementation, the triggering, by the higher layer of the terminal, the beam failure recovery may include: measuring, by the physical layer of the terminal, a quality of a BPL employed in current information transmission for at least one time; and in a case that the physical layer of the terminal determines that a result of the at-least-one-time measurement is lower than or equal to a preset reference threshold, transmitting, by the physical layer of the terminal, third indication information to the higher layer of the terminal, such that the higher layer of the terminal triggers the beam failure recovery according to the third indication information. That is, the physical layer of the terminal measures the quality of the BPL employed in the current information transmission, compares the result of the at-least-one-time measurement with a preset reference threshold, and transmits the third indication information containing a result of the comparison to the higher layer of the terminal, such that the higher layer of the terminal triggers the beam failure recovery. Here, the at-least-one-time measurement is consecutive. In the case that a result of a measurement is higher than the preset reference threshold, the physical layer of the terminal restarts a counting of times of measurements.

Optionally, the triggering, by the higher layer of the terminal, the beam failure recovery may include: measuring, by the physical layer of the terminal, a quality of a BPL employed in current information transmission for at least one time; and indicating, by the physical layer of the terminal to the higher layer of the terminal, a result of the at-least-one-time measurement filtered by a filter; and in the case that the higher layer of the terminal determines that the result of the at-least-one-time measurement is lower than or equal to a preset reference threshold, triggering, by the higher layer of the terminal, the beam failure recovery. That is, the physical layer of the terminal measures the quality of the BPL employed in the current information transmission and indicates to the higher layer of the terminal the result of the at-least-one-time measurement filtered by a filter; the higher layer of the terminal compares the obtained result of the at-least-one-time measurement with the preset reference threshold, and in a case that the condition that the result of the at-least-one-time measurement is lower than or equal to the preset reference threshold is met, the higher layer of the terminal triggers the beam failure recovery. Here, the at-least-one-time measurement may be consecutive, or non-consecutive.

With regard to indicating, by the physical layer of the terminal to the higher layer of the terminal, a result of the measurement filtered by a filter, it may be understood that the result of the measurement goes through filters of a layer L1, a layer L2 and a layer L3 to reach the higher layer of the terminal. The higher layer, also called an upper layer, herein includes the layer L2 and the layer L3; the layer L2 is a Media Access Control (MAC) layer or may further include a Radio Link Control (RLC) layer and a Packet Data Convergence Protocol (PDCP) layer, and the layer L3 is a RRC layer.

It should be noted that, the physical layer of the terminal may report the third indication information or the result of the measurement to the higher layer of the terminal by reporting results of multiple measurements or the third indication information corresponding to the multiple measurements in one report, or by reporting the result of each measurement or the third indication information corresponding to the each measurement sequentially. Further, the at-least-one-time measurement and the reporting may be in one time window, or in different time windows, which is not limited by the present disclosure.

Optionally, measuring, by the physical layer of the terminal, the quality of the BPL employed in the current transmission for at least one time may include: measuring, by the physical layer of the terminal, the BPL employed in the current information transmission for consecutive at least one time in a preset time window.

In summary, the above embodiments mainly describe specific implementations of triggering the beam failure recovery by the terminal, the beam failure recovery may be triggered by the physical layer of the terminal, or the beam failure recovery may be triggered by the higher layer of the terminal.

On the basis of the foregoing embodiments, after the physical layer of the terminal transmits the first indication information to the higher layer of the terminal, the beam failure recovery processing method may further include: receiving, by the higher layer of the terminal, the first indication information; and starting, by the higher layer of the terminal, at least one of a timer and a first counter related to beam failure recovery. The first counter is configured to count the number of times of failure response indication information, and a threshold of the first counter is the first preset number of times.

Optionally, after the higher layer of the terminal triggers the beam failure recovery, the beam failure recovery processing method may further include: starting, by the higher layer of the terminal, at least one of the timer and the first counter related to the beam failure recovery. The first counter is configured to count the number of times of the failure response indication information, and the threshold of the first counter is the first preset number of times.

It may be understood by a person of ordinary skills in the art that, the timer and the first counter related to the beam failure recovery in each of the above two embodiments are identical to those in the other of the above two embodiments. The description herein focuses on two scenarios of starting at least one of the timer and the first counter related to beam failure recovery.

Next, how to determine whether the beam failure recovery succeeds or not is described with respect to a condition that at least one of the timer and the first counter related to beam failure recovery is started.

In a first implementation, how to determine whether the beam failure recovery succeeds or not is described with respect to a condition that the timer related to beam failure recovery is started. In this implementation, determining whether the beam failure recovery succeeds or not may include: in the case that the higher layer of the terminal fails to receive success response indication information corresponding to the beam failure recovery request until the timer related to beam failure recovery expires, determining, by the higher layer of the terminal, that the beam failure recovery fails.

Optionally, after the higher layer of the terminal determines that the beam failure recovery fail, the beam failure recovery processing method may further includes: transmitting, by the higher layer of the terminal, first notification information to the physical layer of the terminal. The first notification information is configured to indicate that the beam failure recovery fails. By means of this embodiment, an intercommunication of information regarding the beam failure recovery failure between the physical layer and the higher layer of the terminal is achieved.

Since the beam failure recovery mechanism in the related art is independent of the RLF, the following problems arise. A first problem is that the RLF persists even if the beam failure recovery succeeds, that is, a successful beam failure recovery can't recover a radio link before a timer related to RLF monitoring expires, as a result, the radio link fails, leading to an excessive data transmission latency in practice; a second problem is that the RLF is not triggered after the beam failure recovery fails, that is, after the beam failure recovery fails, the timer related to the RLF monitoring does not expires, as a result, an RRC re-establishment is not performed by the higher layer of the terminal. Thus, the radio link can't be recovered and thus fails, leading to the excessive data transmission latency in practice.

On basis of the above problems, the present disclosure incorporates the beam failure recovery processing into a RLF monitoring process, thus preventing the problem of the excessive data transmission latency in practice and reducing the data transmission latency.

In the first implementation, how to determine whether the beam failure recovery succeeds or not is described with respect to the condition that the timer related to beam failure recovery is started.

Figure 5:
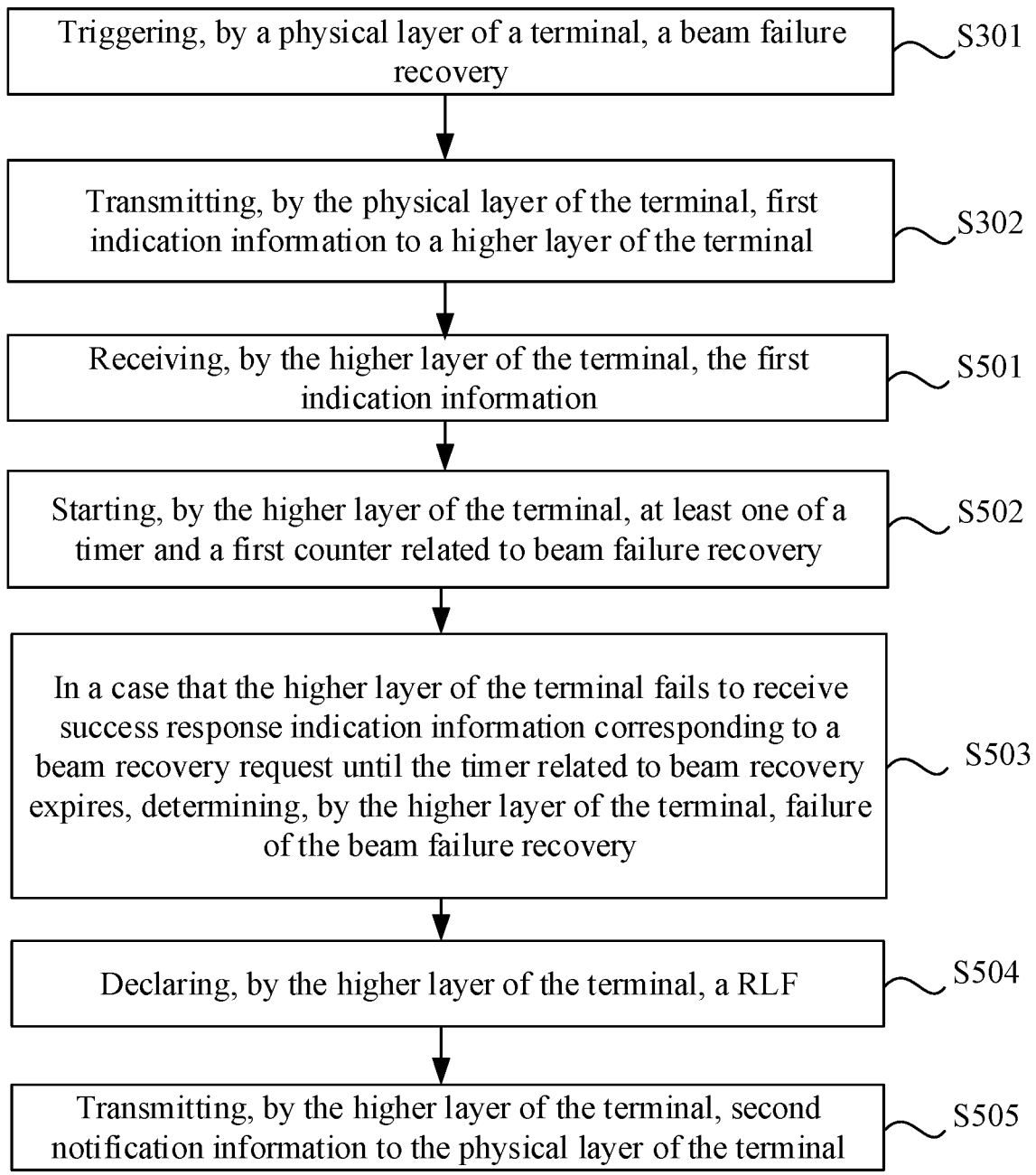
FIG. 5 is a schematic flow diagram of an example of the beam failure recovery processing method provided by the present disclosure.

The following is described by taking FIG. 5 as an example. FIG. 5 is a schematic flow diagram of an example of the beam failure recovery processing method provided by the present disclosure. Referring to FIG. 5, on the basis of the process as shown in FIG. 3, the beam failure recovery processing method may include the following steps S301 to S501.

S301: triggering, by a physical layer of the terminal, the beam failure recovery.

S302: transmitting, by the physical layer of the terminal, first indication information to a higher layer of the terminal.

S501: receiving, by the higher layer of the terminal, the first indication information.

Optionally, if FIG. 5 is based on the process as shown in FIG. 4, then the step S301 is replaced by S401, the step S302 is replaced by S402, the step S501 is deleted, and remainder of the process is identical to that of the process based on FIG. 3, therefore a repeated description is omitted herein. It is also noted that if FIG. 5 is based on the process as shown in FIG. 4, a sequence of the steps S502 and S402 is not limited, that is, the step S502 may be performed before, after or together with the step S402.

S502: starting, by the higher layer of the terminal, at least one of a timer and a first counter related to beam failure recovery.

The first counter is configured to count the number of times of failure response indication information. A threshold of the first counter is the first preset number of times.

It should be noted that, by simply starting the timer and the first counter related to beam failure recovery by the higher layer of the terminal, it may facilitate the higher layer of the terminal to subsequently determining failure of the beam failure recovery failure, thereby improving the efficiency of subsequently determining the failure of the beam failure recovery by the higher layer.

In the method of FIG. 5, S202 may specifically include sub-steps S503 to S505.

S503: in the case that the higher layer of the terminal fails to receive success response indication information corresponding to a beam failure recovery request until the timer related to beam failure recovery expires, determining, by the higher layer of the terminal, failure of the beam failure recovery.

Optionally, after the determining, by the higher layer of the terminal, the failure of the beam failure recovery, the beam failure recovery processing method may further include the following steps.

S504: declaring, by the higher layer of the terminal, a RLF.

S505: transmitting, by the higher layer of the terminal, second notification information to the physical layer of the terminal.

The step S505 is optional, that is, after the declaring, by the higher layer of the terminal, the RLF, the higher layer of the terminal may or may not transmit the second notification information to the physical layer of the terminal. The second notification information is configured to indicate that the higher layer of the terminal declares the RLF.

This step enables the intercommunication between the higher layer and the physical layer of the terminal, such that the physical layer is notified by the higher layer that the current radio link fails, so that the physical layer may perform a data transmission recovery by other means.

In a second implementation, how to determine whether the beam failure recovery succeeds or not is described with respect to a condition that the first counter related to the beam failure recovery is started.

Referring to the above first implementation, the second implementation differs from the first implementation in that, the step 503 of the first implementation is replaced in this second implementation with: in a case that the number of times of failure response indication information corresponding to a beam failure recovery request received by the higher layer of the terminal reaches the first preset number of times, determining, by the higher layer of the terminal, failure of the beam failure recovery. For the failure response indication information corresponding to each beam failure recovery request received the higher layer of the terminal, the first counter is incremented by one.

Additionally, similar to the first implementation, after the determining, by the higher layer of the terminal, failure of the beam failure recovery, the beam failure recovery processing method may further include: transmitting, by the higher layer of the terminal, first notification information to the physical layer of the terminal. The first notification information is configured to indicate the failure of the beam failure recovery. Optionally, after determining, by the higher layer of the terminal, the failure of the beam failure recovery, the beam failure recovery processing method may further include: declaring, by the higher layer of the terminal, a RLF. Further, after declaring, by the higher layer of the terminal, the RLF, the beam failure recovery processing method may further include: transmitting, by the higher layer of the terminal, second notification information to the physical layer of the terminal. The second notification information is configured to indicate that the higher layer of the terminal declares the RLF.

It should be further noted that the second notification information in the first implementation is identical to the second notification information in the second implementation.

The started at least one of the timer and the first counter related to beam failure recovery may be stopped in various ways. For example, if the higher layer of the terminal receives success response indication information corresponding to the beam failure recovery request during operation of the at least one of the timer and the first counter related to beam failure recovery, the higher layer of the terminal stops the at least one of the timer and the first counter related to beam failure recovery.

The determining whether the beam failure recovery succeeds or not may be implemented in a following manner: in the case that the physical layer of the terminal receives the second preset number of failure responses corresponding to a beam failure recovery request, the physical layer of the terminal transmits beam failure recovery failure indication information to the higher layer of the terminal; and the higher layer of the terminal determines the failure of the beam failure recovery. The beam failure recovery failure indication information is configured to indicate that the physical layer of the terminal receives the second preset number of failure responses, e.g., NACK, corresponding to the beam failure recovery request.

Similar to the above embodiment, after determining, by the higher layer of the terminal, failure of the beam failure recovery, the beam failure recovery processing method may include: transmitting, by the higher layer of the terminal, first notification information to the physical layer of the terminal. The first notification information is configured to indicate failure of the beam failure recovery. Further, after determining, by the higher layer of the terminal, failure of the beam failure recovery, the beam failure recovery processing method further includes: declaring, by the higher layer of the terminal, a RLF; and after declaring, by the higher layer of the terminal, the RLF, transmitting, by the higher layer of the terminal, second notification information to the physical layer of the terminal. The second notification information is configured to indicate that the higher layer of the terminal declares the RLF.

As described with respect to the above embodiment, if the beam failure recovery failed, the higher layer of the terminal declares the RLF, and then the terminal performs re-establishment of an RRC. Since the radio link may not recovered before and after the timer related to RLF monitoring expires in a beam failure recovery process, the RLF monitoring is still in operation in the beam failure recovery process to avoid this, so as to enable a rapid radio link recovery and reduce the data transmission latency. A time instant at which the timer related to RLF monitoring is started is a time instant at which an out-of-sync indication transmitted by the physical layer of the terminal is received by the higher layer of the terminal. In specific, the present disclosure may be implemented by the following embodiments.

In an example, after transmitting, by the physical layer of the terminal, the first indication information to the higher layer of the terminal, the higher layer of the terminal receives the first indication information; and the higher layer of the terminal suspends or pauses the timer related to RLF monitoring, or the higher layer of the terminal stops the timer related to RLF monitoring.

In another example, after starting, by the higher layer of the terminal, at least one of the timer and the first counter related to beam failure recovery, the higher layer of the terminal suspends or pauses the timer related to RLF monitoring, or the higher layer of the terminal stops the timer related to RLF monitoring.

The timer related to RLF monitoring may include at least one of: a RLF-related timer and an RLM-related timer. That is, the timer related to RLF monitoring may be either or both of the RLF-related timer and the RLM-related timer, which is not limited by the present disclosure.

Since the beam failure recovery performed by the terminal may yield one of two outcomes: a success of the beam failure recovery or a failure of the beam failure recovery. The case of the failure of the beam failure recovery is described with respect to the above embodiment. The following description focuses on the case of the success of the beam failure recovery.

In specific, determining whether the beam failure recovery succeeds or not may include: in the case that the higher layer of the terminal receives success response indication information corresponding to a beam failure recovery request, determining, by the higher layer of the terminal, the success of the beam failure recovery.

Similar to the case in which the higher layer of the terminal determines the failure of the beam failure recovery, after the higher layer of the terminal determines the success of the beam failure recovery, the beam failure recovery processing method may further include: transmitting, by the higher layer of the terminal, third notification information to the physical layer of the terminal. The third notification information is configured to indicate the success of the beam failure recovery.

Receiving, by the higher layer of the terminal, the success response indication information corresponding to the beam failure recovery request may include: the higher layer of the terminal receives the success response indication information reported by the physical layer of the terminal, i.e., the physical layer of the terminal reports the success response indication information to the higher layer of the terminal in an explicit manner; or the higher layer of the terminal acquires the success response indication information in accordance with an higher-layer signaling transmitted by a network-side device to the terminal, where the success response indication information carries an acknowledgment response, e.g., ACK, corresponding to the beam failure recovery request, that is, by means of the higher-layer signaling transmitted by the network-side device, the higher layer of the terminal learns in an implicit manner that the physical layer of the terminal acquires the success response indication information.

It should be noted that, in embodiments of the present disclosure, receiving information, including both success response indication information and failure response indication information, corresponding to the beam failure recovery request by the higher layer of the terminal may be implemented in the foregoing explicit or implicit manner, a repeated description thereof will be omitted herein. Further, the information corresponding to the beam failure recovery request may be a response corresponding to multiple beam failure recovery requests directed to one beam, or the information corresponding to the beam failure recovery request may be a response corresponding to a beam failure recovery request directed to each one of multiple beams.

In related art, in a case that the higher layer of a terminal determines that a radio link fails, an RRC re-establishment process is started by the higher layer and in a case that there is data to be transmitted, the terminal would conduct a beam training again to search for an appropriate beam for resuming data transmission. Due to a lack of correlation between the RRC re-establishment or the radio link recovery in the higher layer and the beam failure recovery in the physical layer of the terminal in related art, i.e., a lack of interlayer-communication, such a situation as follows may result: assuming that at a certain time point, the physical layer of a terminal is performing a beam failure recovery process and the higher layer of the terminal determines that the radio link fails and commences the RRC re-establishment process; after a while, the beam failure recovery at the physical layer of the terminal is successful performed, i.e., the terminal determines that a data transmission may be resumed on a spare BPL, however the higher layer of the terminal is unaware of this and continues the RRC re-establishment process. In this scenario, the RRC re-establishment would terminate all links and beams at this time, thereby excessively prolonging the latency in data transmission.

Therefore, following embodiments are mainly directed to a message intercommunication between the physical layer and the higher layer of the terminal, so as to associate the beam failure recovery at the physical layer of the terminal with the RLF monitoring process at the higher layer of the terminal.

Figure 6:
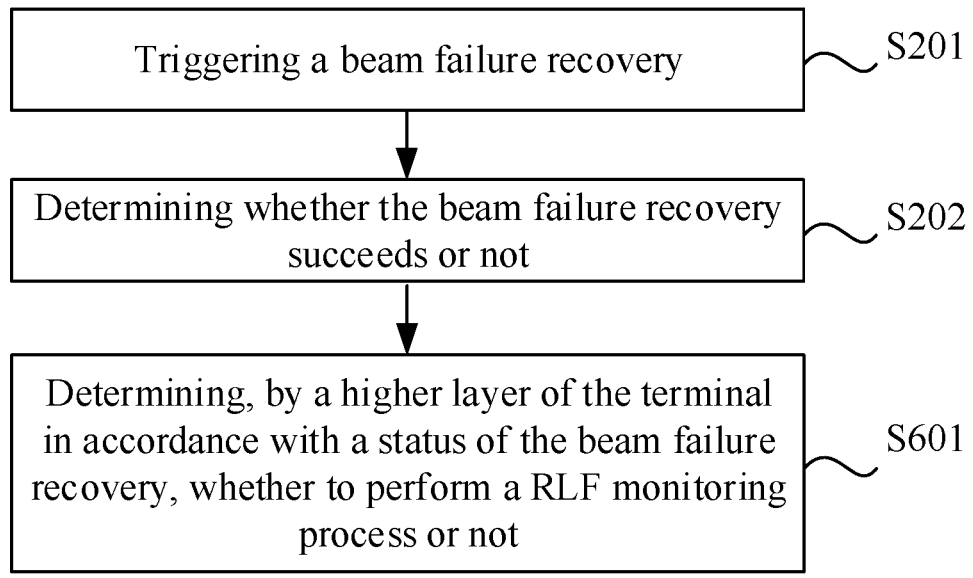
FIG. 6 is a schematic flow diagram of an example of the beam failure recovery processing method provided by the present disclosure.

FIG. 6 is a schematic flow diagram of an example of the beam failure recovery processing method provided by the present disclosure. As shown in FIG. 6, taking a process based on the process as shown in FIG. 2 for example, after determining whether the beam failure recovery succeeds or not, the beam failure recovery processing method may further include a step S601.

S601: determining, by the higher layer of the terminal in accordance with a status of the beam failure recovery, whether to perform a RLF monitoring process or not.

The RLF monitoring process may be considered ongoing before a RLF is declared.

Optionally, determining, by the higher layer of the terminal in accordance with the status of the beam failure recovery, whether to perform the RLF monitoring process or not may include specifically: in the case that the higher layer of the terminal determines a success of the beam failure recovery, terminating, by the higher layer of the terminal, the RLF monitoring process; and in the case that the higher layer of the terminal determines a failure of the beam failure recovery, performing, by the higher layer of the terminal, the RLF monitoring process.

Optionally, performing, by the higher layer of the terminal, the RLF monitoring process may include: starting or restarting, by the higher layer of the terminal, a timer related to RLF monitoring; or triggering, by the higher layer of the terminal, a paused timer related to RLF monitoring to resume operation; or triggering, by the higher layer of the terminal, a suspended timer related to RLF monitoring to resume operation.

In this step, the higher layer of the terminal may determine, in accordance with the status of the beam failure recovery at the physical layer, whether to perform the RLF monitoring process or not, rather than performing the RLF monitoring process blindly, so as to prevent occurrence of a situation that the beam failure recovery at the physical layer succeeds, but a radio link recovery is still performed by the higher layer of the terminal, resulting in a case that a beam just being established is interrupted.

Optionally, after the step S601, the beam failure recovery processing method may further include: in the case that the higher layer of the terminal determines that a RLF occurs, transmitting, by the higher layer of the terminal, a RLF indication to the physical layer of the terminal. Optionally, after the step S601, the beam failure recovery processing method may further include: terminating, by the physical layer of the terminal, the beam failure recovery in accordance with the RLF indication. The terminal may perform one or both of the above two optional steps, which is not limited by the present disclosure.

It may be seen that, in some embodiments of the present disclosure, after the beam failure recovery succeeds, the higher layer of the terminal terminates the RLF monitoring process, to prevent occurrence of the situation that the higher layer of the terminal performs re-establishment of a radio link blindly after the timer related to RLF monitoring expires, resulting in the case that the beam just recovered is terminated again, thus excessively prolonging the latency in data transmission. As a result, the latency in data transmission is reduced.

Figure 7:
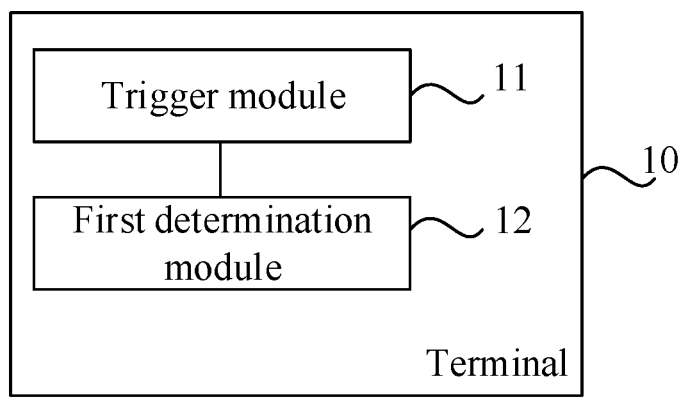
FIG. 7 is a schematic structural diagram of an example of a terminal provided by the present disclosure.

FIG. 7 is a schematic structural diagram of an example of a terminal provided by the present disclosure. As shown in FIG. 7, the terminal 10 includes: a trigger module 11 and a first determination module 12.

The trigger module 11 is configured to trigger a beam failure recovery; and the first determination module 12 is configured to determine whether the beam failure recovery succeeds or not.

The terminal of FIG. 7 may be used to implement solutions of the foregoing method embodiments and has a similar implementation principle and technical effect, a detailed description thereof is not repeated herein.

Figure 8:
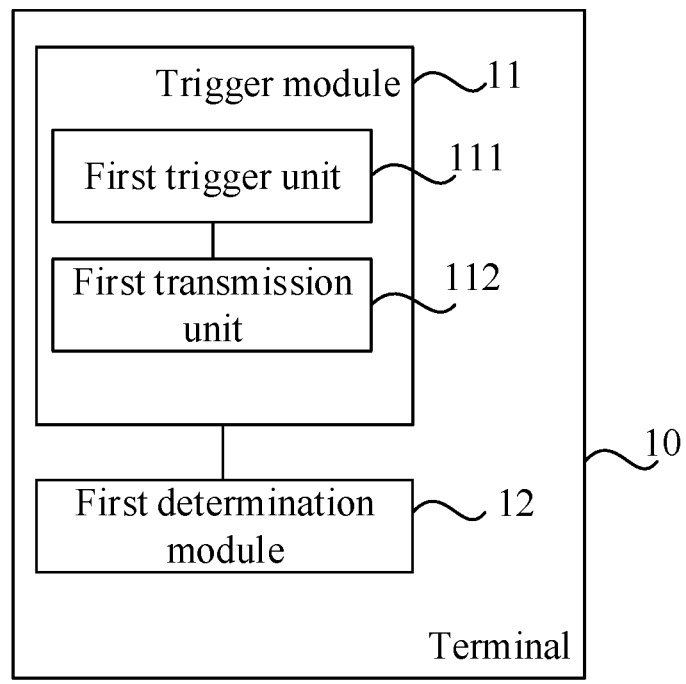
FIG. 8 is a schematic structural diagram of an example of the terminal provided by the present disclosure.

FIG. 8 is a schematic structural diagram of an example of the terminal provided by the present disclosure. As shown in FIG. 8, on the basis of the structure as shown in FIG. 7, the trigger module 11 may include a first trigger unit 111 and a first transmission unit 112.

The first trigger unit 111 is configured to trigger, through a physical layer of the terminal, the beam failure recovery; and the first transmission unit 112 is configured to transmit, through the physical layer of the terminal, first indication information to a higher layer of the terminal. The first indication information is configured to indicate that the beam failure recovery has been triggered by the physical layer of the terminal or the beam failure recovery is triggered by the physical layer of the terminal after a preset time duration.

Figure 9:
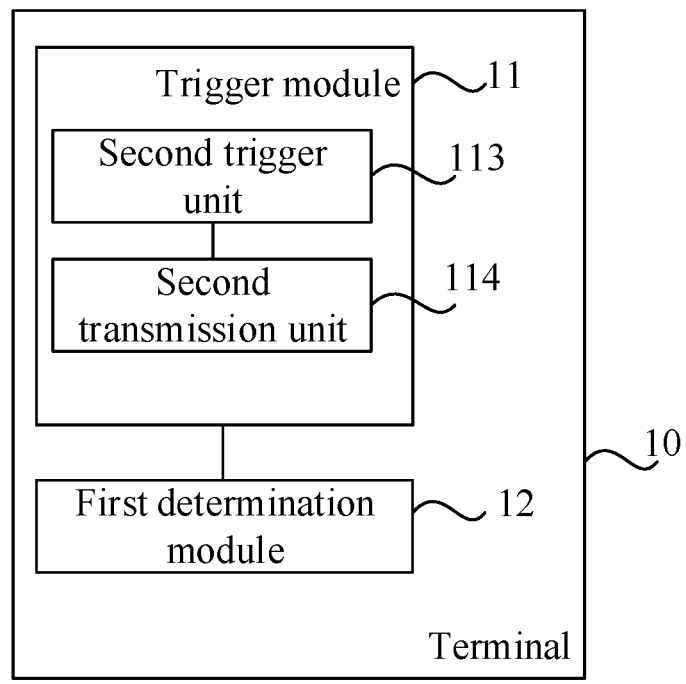
FIG. 9 is a schematic structural diagram of an example of the terminal provided by the present disclosure.

FIG. 9 is a schematic structural diagram of an example of the terminal provided by the present disclosure. As shown in FIG. 9, on the basis of the structure as shown in FIG. 7, the trigger module 11 may include a second trigger unit 113 and a second transmission unit 114.

The second trigger unit 113 is configured to trigger, through a higher layer of the terminal, the beam failure recovery; and the second transmission unit 114 is configured to transmit, through the higher layer of the terminal, second indication information to a physical layer of the terminal. The second indication information is configured to indicate that the beam failure recovery has been triggered by the higher layer of the terminal, or the second indication information is configured to instruct the physical layer of the terminal to perform the beam failure recovery.

Optionally, the second trigger unit 113 may be configured to: measure, through the physical layer of the terminal, a quality of a BPL employed in current information transmission for at least one time; and in a case that the physical layer of the terminal determines that a result of the at-least-one-time measurement is lower than or equal to a preset reference threshold, transmit, through the physical layer of the terminal, third indication information to the higher layer of the terminal, such that the higher layer of the terminal triggers the beam failure recovery according to the third indication information.

Optionally, the second trigger unit 113 may be configured to: measure, through the physical layer of the terminal, a quality of a BPL employed in current information transmission for at least one time; and indicate, through the physical layer of the terminal to the higher layer of the terminal, a result of the measurement filtered by a filter; and in the case that the higher layer of the terminal determines that the result of the at-least-one-time measurement is lower than or equal to a preset reference threshold, trigger, through the higher layer of the terminal, the beam failure recovery.

Optionally, when the second trigger unit 113 measures, through the physical layer of the terminal, the quality of the BPL employed in the current transmission for at least one time, the second trigger unit 113 is specifically configured to: measure, through the physical layer of the terminal, the BPL employed in the current information transmission for consecutive at least one time in a preset time window.

Figure 10:
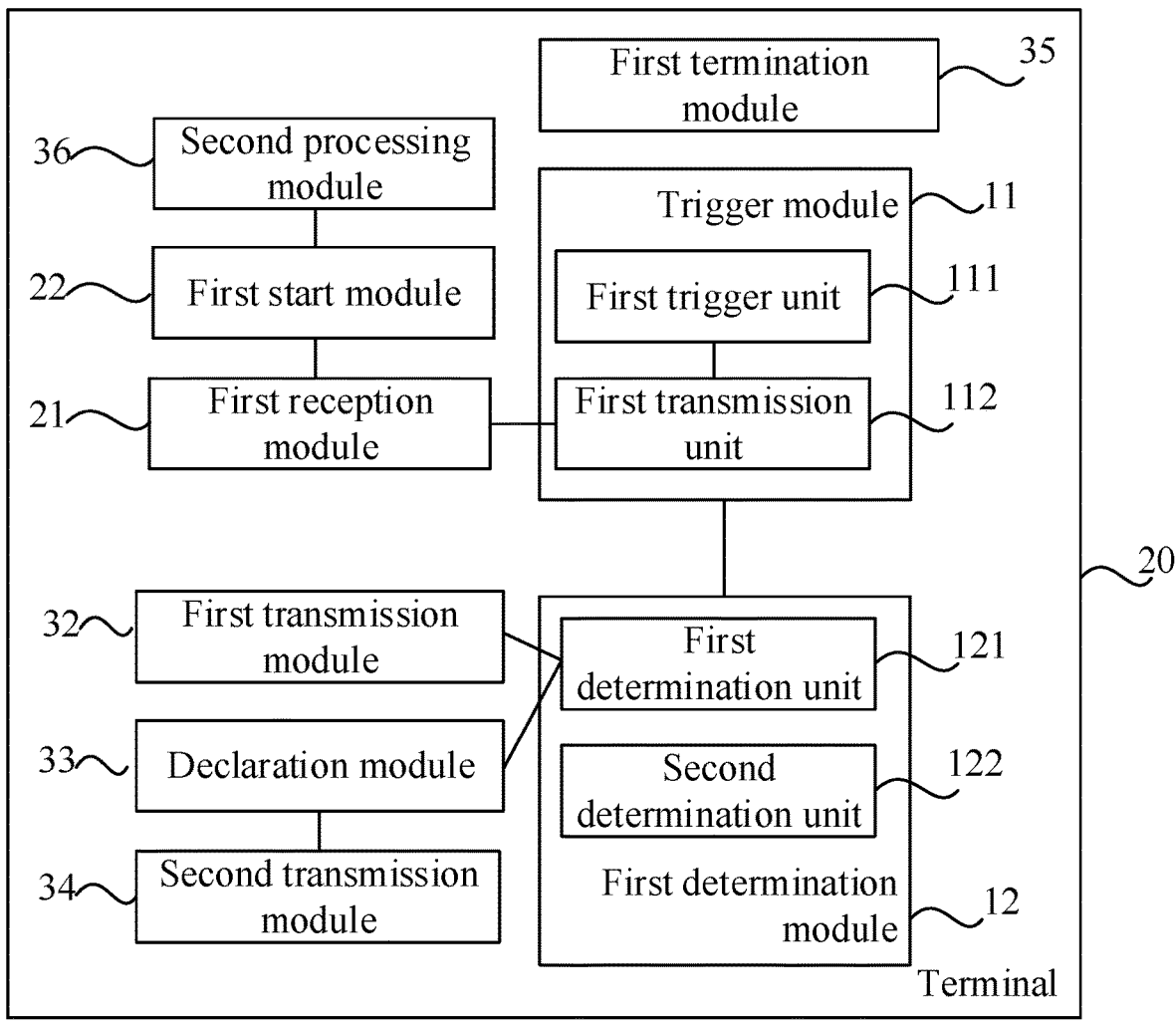
FIG. 10 is a schematic structural diagram of an example of the terminal provided by the present disclosure.

FIG. 10 is a schematic structural diagram of an example of the terminal provided by the present disclosure. As shown in FIG. 10, on the basis of the structure as shown in FIG. 8, the terminal 20 may further include a first reception module 21 and a first start module 22.

The first reception module 21 is configured to receive, through the higher layer of the terminal, first indication information after the first transmission unit 112 transmits, through the physical layer of the terminal, the first indication information to the higher layer of the terminal. The first start module 22 is configured to start, through the higher layer of the terminal, at least one of a timer and a first counter related to beam failure recovery. The first counter is configured to count the number of times of failure response indication information. A threshold of the first counter is the first preset number of times.

Figure 11:
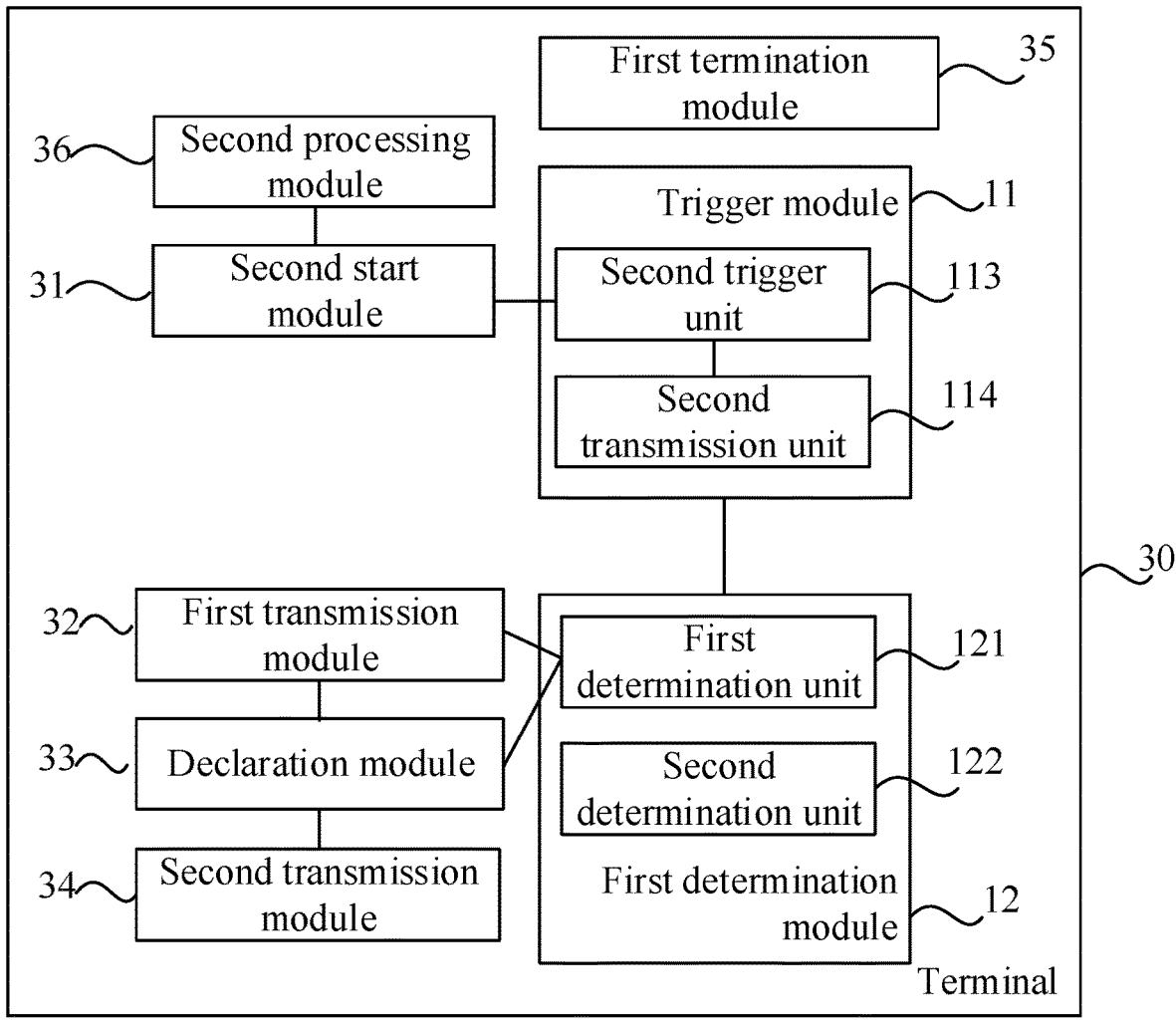
FIG. 11 is a schematic structural diagram of an example of the terminal provided by the present disclosure.

FIG. 11 is a schematic structural diagram of an example of the terminal provided by the present disclosure. As shown in FIG. 11, on the basis of the structure as shown in FIG. 9, the terminal 30 may further include a second start module 31.

The second start module 31 is configured to start, through the higher layer of the terminal, at least one of a timer and a first counter related to beam failure recovery after the second trigger unit 113 triggers, through the higher layer of the terminal, the beam failure recovery. The first counter is configured to count the number of times of failure response indication information. A threshold of the first counter is the first preset number of times.

In an implementation, on the basis of the structure as shown in FIG. 10 or FIG. 11, the first determination module 12 may further include a first determination unit 121. The first determination unit 121 is configured to: in the case that success response indication information corresponding to the beam failure recovery request is not received through the higher layer of the terminal until the timer related to beam failure recovery expires, determine, through the higher layer of the terminal, failure of the beam failure recovery.

In another implementation, on the basis of the structure as shown in FIG. 10 or FIG. 11, the first determination module 12 may further include a second determination unit 122. The second determination unit 122 is configured to: in a case that the number of times of failure response indication information corresponding to the beam failure recovery request received through the higher layer of the terminal reaches the first preset number of times, determine, through the higher layer of the terminal, failure of the beam failure recovery.

In the above two implementations, optionally, the terminal 20 or the terminal 30 may further include a first transmission module 32. The first transmission module 32 is configured to: transmit, through the higher layer of the terminal, first notification information to the physical layer of the terminal after the first determination unit 121 determines, through the higher layer of the terminal, failure of the beam recover. The first notification information is configured to indicate the failure of the beam failure recovery.

Optionally, the terminal 20 or the terminal 30 may further include a declaration module 33. The declaration module 33 is configured to declare, through the higher layer of the terminal, a RLF after the first determination unit 121 determines, through the higher layer of the terminal, failure of the beam failure recovery.

Optionally, the terminal 20 or the terminal 30 may further include a second transmission module 34. The second transmission module 34 is configured to transmit, through the higher layer of the terminal, second notification information to the physical layer of the terminal after the declaration module 33 declares, through the higher layer of the terminal, the RLF. The second notification information is configured to indicate that the higher layer of the terminal declares the RLF.

In yet another implementation, on the basis of the structure as shown in FIG. 10 or FIG. 11, the terminal 20 or the terminal 30 may further include a first termination module 35. The first termination module 35 is configured to: in the case that success response indication information corresponding to the beam failure recovery request is received through the higher layer of the terminal during operation of at least one of a timer and a first counter related to beam failure recovery, stop, through the higher layer of the terminal, the at least one of the timer and the first counter related to beam failure recovery.

In still another implementation, on the basis of the structure as shown in FIG. 10 or FIG. 11, the terminal 20 or the terminal 30 may further include a second processing module 36. The second processing module 36 is configured to suspend or pause, through the higher layer of the terminal, an timer related to RLF monitoring, or terminate, through the higher layer of the terminal, the timer related to RLF monitoring after the first start module 22 or the second start module 31 starts, through the higher layer of the terminal, at least one of the timer and the first counter related to beam failure recovery.

Figure 12:
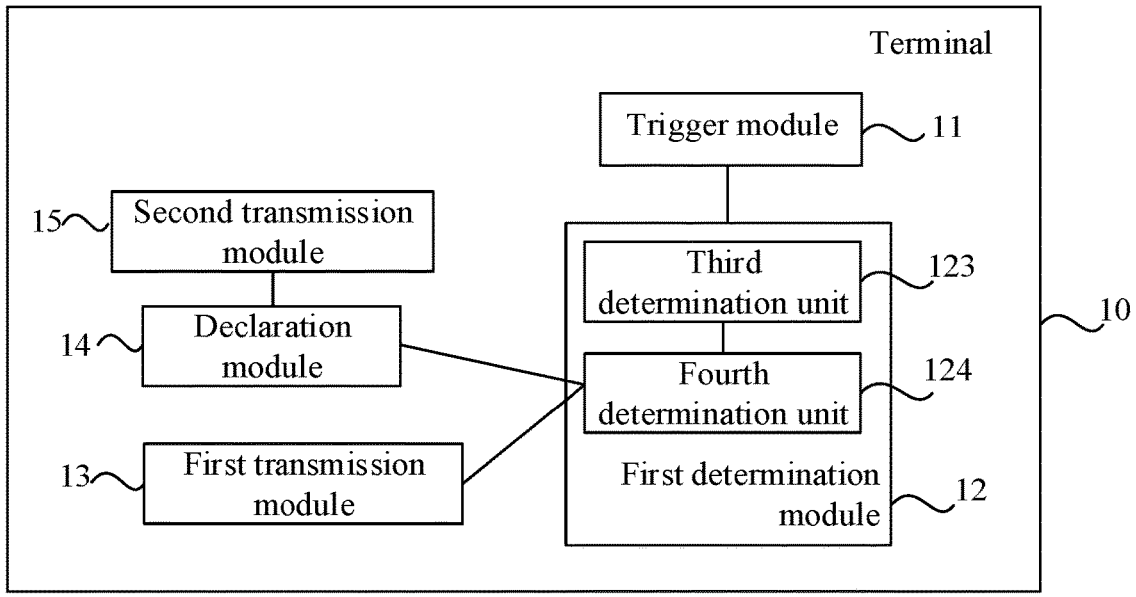
FIG. 12 is a schematic structural diagram of an example of the terminal provided by the present disclosure.

FIG. 12 is a schematic structural diagram of an example of the terminal provided by the present disclosure. As shown in FIG. 12, on the basis of the structure as shown in FIG. 7, the first determination module 12 includes a third determination unit 123 and a fourth determination unit 124. The third determination unit 123 is configured to: in the case that the second preset number of failure responses corresponding to the beam failure recovery request is received through the physical layer of the terminal, transmit, through the physical layer of the terminal, beam failure recovery failure indication information to the higher layer of the terminal. The fourth determination unit 124 is configured to determine, through the higher layer of the terminal, failure of the beam failure recovery.

The beam failure recovery failure indication information is configured to indicate that the physical layer of the terminal receives the second preset number of failure responses corresponding to the beam failure recovery request.

Optionally, the terminal 10 may further include a first transmission module 13. The first transmission module 13 is configured to: transmit, through the higher layer of the terminal, first notification information to the physical layer of the terminal after the fourth determination unit 124 determines, through the higher layer of the terminal, the failure of the beam failure recovery. The first notification information is configured to indicate the failure of the beam failure recovery.

Optionally, the terminal 10 may further include a declaration module 14. The declaration module 14 is configured to declare, through the higher layer of the terminal, a RLF after the fourth determination unit 124 determines, through the higher layer of the terminal, failure of the beam failure recovery.

Further, the terminal 10 may include a second transmission module 15. The second transmission module 15 is configured to transmit, through the higher layer of the terminal, second notification information to the physical layer of the terminal after the declaration module 14 declares, through the higher layer of the terminal, the RLF. The second notification information is configured to indicate that the higher layer of the terminal declares the RLF.

Figure 13:
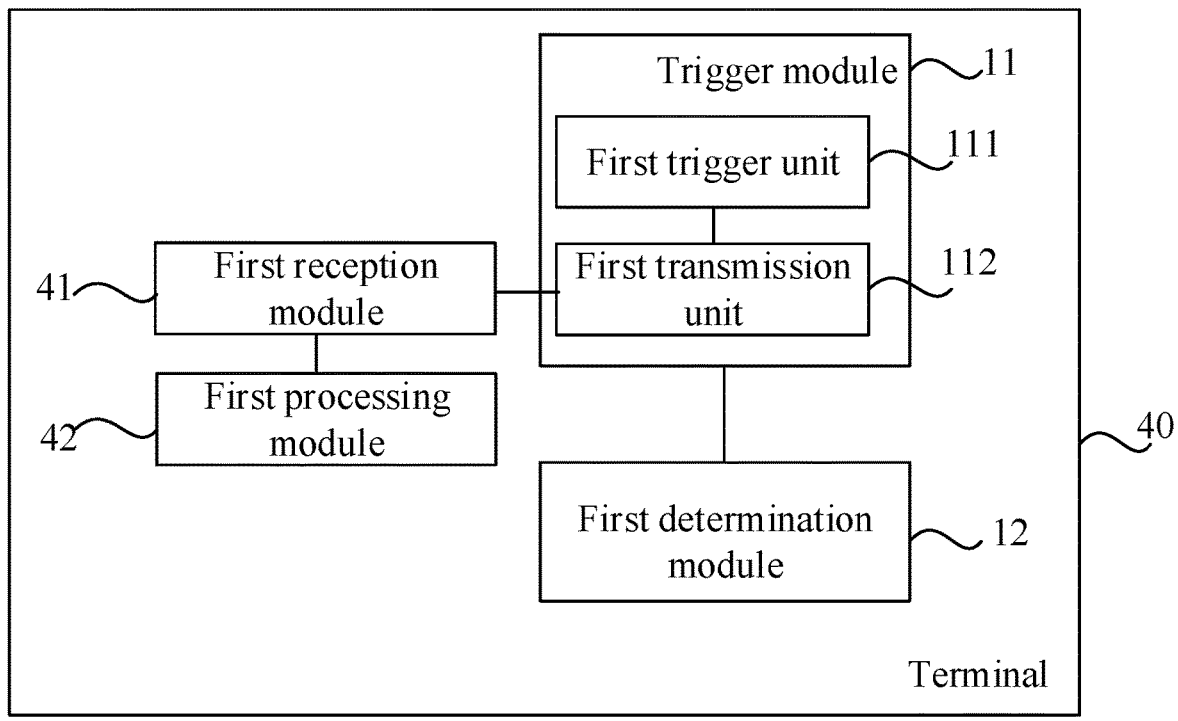
FIG. 13 is a schematic structural diagram of an example of the terminal provided by the present disclosure.

FIG. 13 is a schematic structural diagram of an example of the terminal provided by the present disclosure. As shown in FIG. 13, on the basis of the structure as shown in FIG. 8, the terminal 40 may further include a first reception module 41 and a first processing module 42. The first reception module 41 is configured to receive, through the higher layer of the terminal, first indication information after the first transmission unit 112 transmits, through the physical layer of the terminal, the first indication information to the higher layer of the terminal. The first processing module 42 is configured to suspend or pause, through the higher layer of the terminal, a timer related to RLF monitoring, or stop, through the higher layer of the terminal, the timer related to RLF monitoring.

Figure 14:
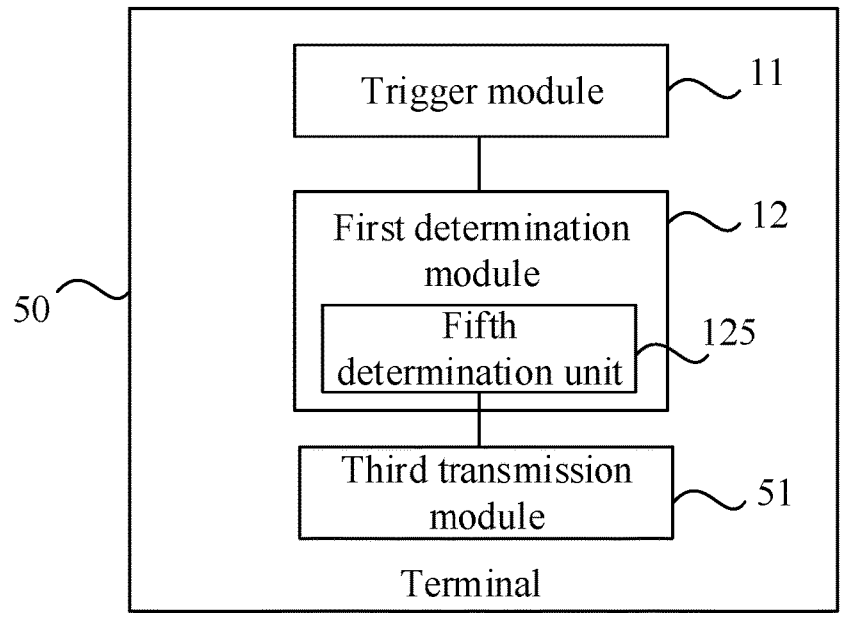
FIG. 14 is a schematic structural diagram of an example of the terminal provided by the present disclosure.

FIG. 14 is a schematic structural diagram of an example of the terminal provided by the present disclosure. As shown in FIG. 14, on the basis of the structure as shown in FIG. 7, the first determination module 12 may include a fifth determination unit 125. The fifth determination unit is configured to: in the case that success response indication information corresponding to the beam failure recovery request is received through the higher layer of the terminal, determine, through the higher layer of the terminal, success of the beam failure recovery.

On basis of this, the terminal 50 may further include a third transmission module 51. The third transmission module 51 is configured to transmit, through the higher layer of the terminal, third notification information to the physical layer of the terminal after the fifth determination unit 125 determines, through the higher layer of the terminal, success of the beam failure recovery. The third notification information is configured to indicate the success of the beam failure recovery.

Optionally, the fifth determination unit 125 receiving, through the higher layer of the terminal, the success response indication information corresponding to the beam failure recovery request may include: receiving, through the higher layer of the terminal, the success response indication information reported by the physical layer of the terminal; or acquiring, through the higher layer of the terminal, the success response indication information in accordance with an higher-layer signaling transmitted by a network-side device to the terminal. The success response indication information carries an acknowledgment response corresponding to the beam failure recovery request.

The timer related to RLF monitoring may include at least one of a RLF-related timer and an RLM-related timer.

Figure 15:
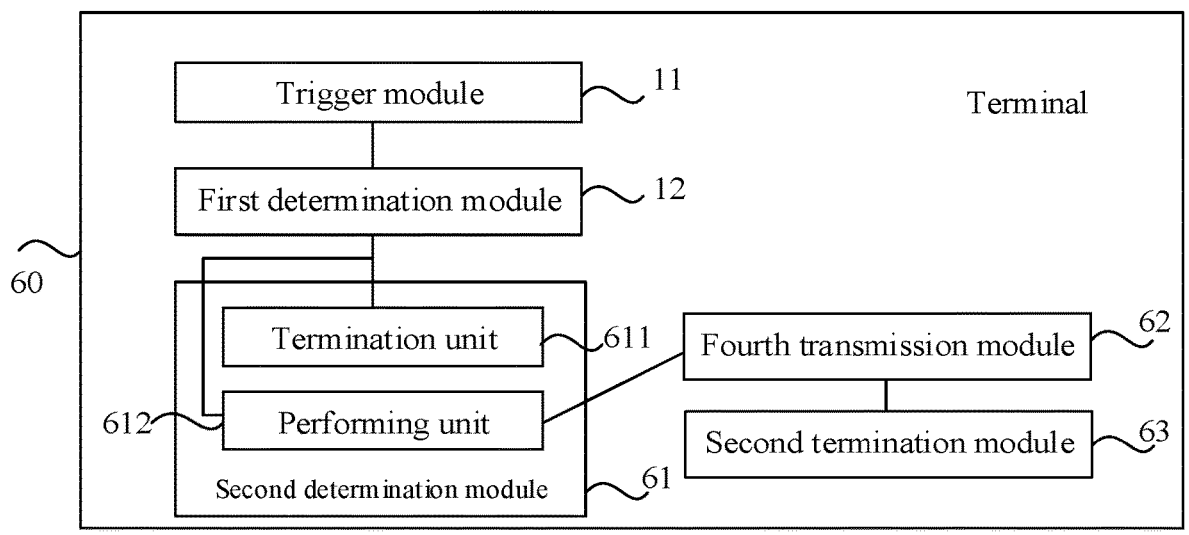
FIG. 15 is a schematic structural diagram of an example of the terminal provided by the present disclosure.

FIG. 15 is a schematic structural diagram of an example of the terminal provided by the present disclosure. As shown in FIG. 15, on the basis of the structure as shown in FIG. 7, the terminal 60 may further include a second determination module 61. The second determination module 61 is configured to determine, through the higher layer of the terminal in accordance with a status of the beam failure recovery, whether to perform a RLF monitoring process or not after the first determination module 12 determines whether the beam failure recovery succeeds or not.

Optionally, the second determination module 61 may include a termination unit 611 and a performing unit 612. The termination unit 611 is configured to, in the case that the success of the beam failure recovery is determined through the higher layer of the terminal, terminate, through the higher layer of the terminal, the RLF monitoring process. The performing unit 612 is configured to, in the case that failure of the beam failure recovery is determined through the higher layer of the terminal, perform, through the higher layer of the terminal, the RLF monitoring process.

Further, the performing unit 612 may be specifically configured to: start or restart, through the higher layer of the terminal, an timer related to RLF monitoring; or trigger, through the higher layer of the terminal, a paused timer related to RLF monitoring to resume operation of the timer; or trigger, through the higher layer of the terminal, a suspended timer related to RLF monitoring to resume operation of the timer.

In an embodiment, the terminal 60 may further include a fourth transmission module 62 and a second termination module 63. The fourth transmission module 62 is configured to: in the case that a RLF is determined through the higher layer of the terminal, transmit a RLF indication to the physical layer of the terminal. The second termination module 63 is configured to terminate, through the physical layer of the terminal, the beam failure recovery in accordance with the RLF indication.

The aforementioned terminal may implement the various processes implemented by the terminal in the method embodiments as shown in FIG. 2 to FIG. 6, and a detailed description thereof is omitted to avoid repetition.

Figure 16:
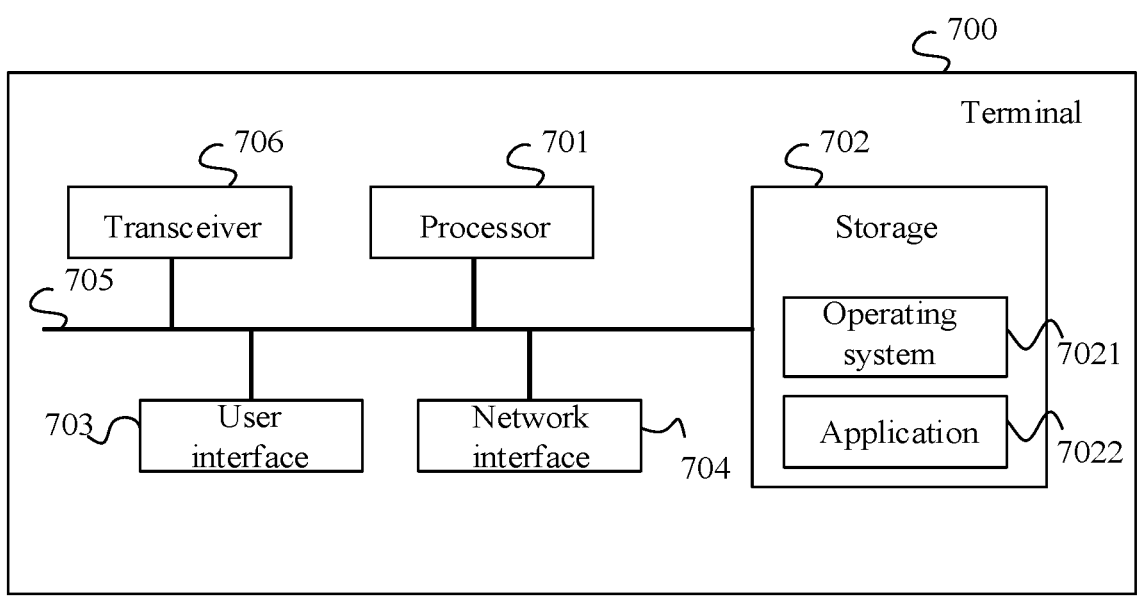
FIG. 16 is a schematic structural diagram of an example of the terminal provided by the present disclosure.

FIG. 16 is a schematic structural diagram of an example of a terminal provided by the present disclosure. The terminal 700 as shown in FIG. 16 includes: at least one processor 701, a storage 702, at least one network interface 704 and a user interface 703. Components of the terminal 700 are coupled to each other through a bus system 705. It may be understood that the bus system 705 is configured to enable communication connections among these components. The bus system 705 may include a data bus, a power bus, a control bus and a status signal bus. However, for clarity, various buses are all labeled as the bus system 705 in FIG. 16. Additionally, some embodiments of the present disclosure further include a transceiver 706. The transceiver may be multiple elements, such as a transmitter and a receiver, configured to provide units for communication with various other apparatuses on a transmission medium.

The user interface 703 may include a display, a keyboard or a pointing device (e.g., a mouse), a trackball, a touchpad, a touch screen, etc.

It may be understood that the storage 702 in some embodiments of the present disclosure may be a volatile storage or a non-volatile storage, or may include both the volatile storage and the non-volatile storage. The non-volatile storage may be a Read-Only Memory (ROM, for short), a Programmable ROM (PROM, for short), an Erasable PROM (EPROM, for short), an Electrically EPROM (EEPROM, for short) or a flash memory. The volatile storage may be a Random Access Memory (RAM, for short), which is used as an external cache. By way of illustrative but not restrictive description, many forms of RAM may be used, such as a Static RAM (SRAM, for short), a Dynamic RAM (DRAM, for short), a Synchronous DRAM (SDRAM, for short), a Double Data Rate SDRAM (DDRSDRAM, for short), an Enhanced SDRAM (ES-DRAM, for short), a Synchlink DRAM (SLDRAM, for short) and a Direct Rambus RAM (DRRAM, for short). The storage 702 used in the system and the method described in some embodiments of the present disclosure is intended to include, but be not limited to, these and any other suitable types of storages.

In some implementations, the storage 702 stores following elements: an executable module or a data structure, or a subset or an extension set thereof, such as an operating system 7021 and an application 7022.

The operating system 7021 includes various system programs, such as a framework layer, a core library layer and a driver layer, used to implement various fundamental services and process hardware-based tasks. The application 7022 includes various application programs, such as a Media Player and a Browser, to implement a variety of application services. The programs implementing the method according to embodiments of the present disclosure may be included in the application 7022.

According to some embodiments of the present disclosure, by calling programs or instructions stored in the storage 702 which may specifically be programs or instructions stored in the application 7022, the processor 701 is configured to trigger a beam failure recovery; and determine whether the beam failure recovery succeeds or not.

The method disclosed in the embodiments of the present disclosure may be applied to the processor 701 or implemented by the processor 701. The processor 701 may be an integrated circuit (IC) chip capable of processing signals. During the process of implementation, steps of the foregoing method may be implemented by hardware in form of integrated logic circuits in the processor 701, or by software in form of instructions. The processor 701 may be a general purpose processor, a Digital Signal Processor (DSP, for short), an Application Specific Integrated Circuit (ASIC, for short), a Field Programmable Gate Array (FPGA, for short)

or other programmable logic devices, a discrete gate or a transistor logic device, a discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed in combination with the embodiments of the present disclosure may be embodied directly as hardware in a coding processor, or performed by a combination of the hardware in the coding processor and software modules. The software modules may reside in a well-established storage medium in the art, such as a RAM, a flash memory, a ROM, a PROM or an EEPROM, a register, etc. The storage medium resides in the storage 702. The processor 701 reads information from the storage 702 and performs the steps of the methods in combination with hardware in the processor.

It may be understood that the embodiments described in the present disclosure may be implemented by hardware, software, firmware, middleware, a microcode or a combination thereof. For implementation by hardware, a processing unit may be implemented in one or more of an Application Specific Integrated Circuits (ASIC, for short), a Digital Signal Processor (DSP, for short), a DSP Device (DSPD, for short), a Programmable Logic Device (PLD, for short), a Field-Programmable Gate Array (FPGA, for short), a general purpose processor, a controller, a microcontroller, a microprocessor, other electronic units configured to perform the functions described in this application or a combination thereof.

For implementation by software, technical solutions described in the embodiments of the present disclosure may be implemented by a module (e.g., a process, a function, etc.) configured to perform functions described in the embodiments of the present disclosure. Software codes may be stored in a storage and executed by the processor 701. The storage 702 may be implemented internal or external to the processor 701.

Optionally, when triggering the beam failure recovery, the processor 701 is specifically configured to: trigger, through a physical layer of the terminal, the beam failure recovery; transmit, through the physical layer of the terminal, first indication information to a higher layer of the terminal, wherein the first indication information is configured to indicate that the beam failure recovery is triggered by the physical layer of the terminal or the first indication information is configured to indicate that the beam failure recovery is triggered by the physical layer of the terminal after a preset time duration.

Optionally, when triggering the beam failure recovery, the processor 701 is specifically configured to: trigger, through the higher layer of the terminal, the beam failure recovery; transmit, through the higher layer of the terminal, second indication information to a physical layer of the terminal, wherein the second indication information is configured to indicate that the beam failure recovery is triggered by the higher layer of the terminal, or the second indication information is configured to instruct the physical layer of the terminal to perform the beam failure recovery.

Optionally, when triggering, through the higher layer of the terminal, the beam failure recovery, the processor 701 is specifically configured to: measure, through the physical layer of the terminal, a quality of a Beam Pair Link (BPL) employed in current information transmission for at least one time; and in a case that the physical layer of the terminal determines that a result of the at-least-one-time measurement is lower than or equal to a preset reference threshold, transmit, through the physical layer of the terminal, third indication information to the higher layer of the terminal, such that the higher layer of the terminal triggers the beam failure recovery according to the third indication information.

Optionally, when triggering, through the higher layer of the terminal, the beam failure recovery, the processor 701 is specifically configured to: measure, through the physical layer of the terminal, a quality of a BPL employed in current information transmission for at least one time; and indicate, through the physical layer of the terminal to the higher layer of the terminal, a result of the measurement filtered by a filter; and in the case that the higher layer of the terminal determines that the result of the at-least-one-time measurement is lower than or equal to a preset reference threshold, trigger, through the higher layer of the terminal, the beam failure recovery.

Optionally, when measuring, through the physical layer of the terminal, the quality of the BPL employed in the current transmission for at least one time, the processor 701 is specifically configured to: measure, through the physical layer of the terminal, the BPL employed in the current information transmission for consecutive at least one time in a preset time window.

Optionally, after transmitting, through the physical layer of the terminal, the first indication information to the higher layer of the terminal, the processor 701 is further configured to: receive, through the higher layer of the terminal, first indication information; start, through the higher layer of the terminal, at least one of a timer and a first counter related to beam failure recovery, wherein the first counter is configured to count the number of times of failure response indication information, and a threshold of the first counter is the first preset number of times.

Optionally, after triggering, through the higher layer of the terminal, the beam failure recovery, the processor 701 is configured to: start, through the higher layer of the terminal, at least one of a timer and a first counter related to beam failure recovery, wherein the first counter is configured to count the number of times of failure response indication information, and a threshold of the first counter is the first preset number of times.

Optionally, when determining whether the beam failure recovery succeeds or not, the processor 701 is specifically configured to: in the case that success response indication information corresponding to the beam failure recovery request is not received by the higher layer of the terminal until the timer related to beam failure recovery expires, determine, through the higher layer of the terminal, failure of the beam failure recovery.

Optionally, after determining, through the higher layer of the terminal, the failure of the beam failure recovery, the processor 701 is further configured to: transmit, through the higher layer of the terminal, first notification information to the physical layer of the terminal, wherein the first notification information is configured to indicate the failure of the beam failure recovery.

Optionally, after determining, through the higher layer of the terminal, the failure of the beam failure recovery, the processor 701 is further configured to: declare, through the higher layer of the terminal, a RLF.

Optionally, after declaring, through the higher layer of the terminal, the RLF, the processor 701 is further configured to: transmit, through the higher layer of the terminal, second notification information to the physical layer of the terminal, wherein the second notification information is configured to indicate that the higher layer of the terminal declares the RLF.

Optionally, when determining whether the beam failure recovery succeeds or not, the processor 701 is specifically configured to: in the case that the number of times that failure response indication information corresponding to the beam failure recovery request is received by the higher layer of the terminal reaches the first preset number of times, determine, through the higher layer of the terminal, the failure of the beam failure recovery.

Optionally, after determining, through the higher layer of the terminal, the failure of the beam failure recovery, the processor 701 is further configured to: transmit, through the higher layer of the terminal, first notification information to the physical layer of the terminal, wherein the first notification information is configured to indicate the failure of the beam failure recovery.

Optionally, after determining, through the higher layer of the terminal, the failure of the beam failure recovery, the processor 701 is further configured to: declare, through the higher layer of the terminal, a RLF.

Optionally, after declaring, through the higher layer of the terminal, the RLF, the processor 701 is further configured to: transmit, through the higher layer of the terminal, second notification information to the physical layer of the terminal, wherein the second notification information is configured to indicate that the higher layer of the terminal declares the RLF.

Optionally, the processor 701 is further configured to: in the case that the higher layer of the terminal receives success response indication information corresponding to the beam failure recovery request during operation of at least one of the timer and the first counter related to beam failure recovery, stop, through the higher layer of the terminal, the at least one of the timer and the first counter related to beam failure recovery.

Optionally, when determining whether the beam failure recovery succeeds or not, the processor 701 is specifically configured to: in the case that the physical layer of the terminal receives the second preset number of failure responses corresponding to the beam failure recovery request, transmit, through the physical layer of the terminal, beam failure recovery failure indication information to the higher layer of the terminal; and determine, through the higher layer of the terminal, the failure of the beam failure recovery, wherein the beam failure recovery failure indication information is configured to indicate that the physical layer of the terminal receives the second preset number of failure responses corresponding to the beam failure recovery request.

Optionally, after determining, through the higher layer of the terminal, the failure of the beam failure recovery, the processor 701 is further configured to: transmit, through the higher layer of the terminal, first notification information to the physical layer of the terminal, wherein the first notification information is configured to indicate the failure of the beam failure recovery.

Optionally, after determining, through the higher layer of the terminal, the failure of the beam failure recovery, the processor 701 is further configured to: declare, through the higher layer of the terminal, a RLF.

Optionally, after declaring, through the higher layer of the terminal, the RLF, the processor 701 is further configured to: transmit, through the higher layer of the terminal, second notification information to the physical layer of the terminal, wherein the second notification information is configured to indicate that the higher layer of the terminal declares the RLF.

Optionally, after transmitting, through the physical layer of the terminal, the first indication information to the higher layer of the terminal, the processor 701 is further configured to: receive, through the higher layer of the terminal, the first indication information; and suspend or pause, through the higher layer of the terminal, an timer related to RLF monitoring, or stop, through the higher layer of the terminal, the timer related to RLF monitoring.

Optionally, after starting, through the higher layer of the terminal, at least one of the timer and the first counter related to beam failure recovery, the processor 701 is further configured to: suspend or pause, through the higher layer of the terminal, an timer related to RLF monitoring, or stop, through the higher layer of the terminal, the timer related to RLF monitoring.

Optionally, when determining whether the beam failure recovery succeeds or not, the processor 701 is specifically configured to: in the case that the higher layer of the terminal receives success response indication information corresponding to the beam failure recovery request, determine, through the higher layer of the terminal, a success of the beam failure recovery.

Optionally, after determining, through the higher layer of the terminal, the success of the beam failure recovery, the processor 701 is further configured to: transmit, through the higher layer of the terminal, third notification information to the physical layer of the terminal, wherein the third notification information is configured to indicate the success of the beam failure recovery.

Optionally, when receiving, through the higher layer of the terminal, success response indication information corresponding to the beam failure recovery request, the processor 701 is specifically configured to: receive, through the higher layer of the terminal, the success response indication information reported by the physical layer of the terminal; or acquire, through the higher layer of the terminal, the success response indication information in accordance with an higher-layer signaling transmitted by a network-side device to the terminal, wherein the success response indication information carries an acknowledgment response corresponding to the beam failure recovery request.

Optionally, the timer related to RLF monitoring includes at least one of: a RLF-related timer and a Radio Link Monitoring (RLM)-related timer.

Optionally, after determining whether the beam failure recovery succeeds or not, the processor 701 is further configured to: determine, through the higher layer of the terminal in accordance with a status of the beam failure recovery, whether to perform a RLF monitoring process or not.

Optionally, when determining, through the higher layer of the terminal in accordance with the status of the beam failure recovery, whether to perform the RLF monitoring process or not, the processor 701 is specifically configured to: in the case that the higher layer of the terminal determines that the beam failure recovery succeeds, terminate, through the higher layer of the terminal, the RLF monitoring process; and in the case that the higher layer of the terminal determines that the beam failure recovery does not succeed, perform, through the higher layer of the terminal, the RLF monitoring process.

Optionally, when performing, through the higher layer of the terminal, the RLF monitoring process, the processor 701 is specifically configured to: start or restart, through the higher layer of the terminal, an timer related to RLF monitoring; or trigger, through the higher layer of the terminal, a paused timer related to RLF monitoring to resume operation of the paused timer; or trigger, through the higher layer of the terminal, a suspended timer related to RLF monitoring to resume operation of the suspended timer.

Optionally, the processor 701 is further configured to: in the case that the higher layer of the terminal determines a RLF occurs, transmit, through the higher layer of the terminal, a RLF indication to the physical layer of the terminal; and terminate, through the physical layer of the terminal, the beam failure recovery in accordance with the RLF indication.

The present disclosure triggers a beam failure recovery and further determines whether the beam recover succeeds or not, so that in case that a beam fails or the beam failure recovery fails, a radio link may be recovered rapidly, thereby improving reliability of data transmission and reducing a latency of the data transmission.

The aforementioned terminal may implement the various processes implemented by the terminal in the above embodiments, and a detailed description thereof is omitted to avoid repetition.

A person skilled in the art may be aware that, units and algorithm steps, described in combination with examples described in the embodiments of the present disclosure, may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for convenient and brief description, a detailed operating process of the foregoing system, apparatus, and unit may be obtained by referring to a corresponding process in the foregoing method embodiments, and details are not described herein again.

In the several embodiments provided in the present application, it should be understood that the disclosed device and method may be implemented in other manners. For example, the described device embodiment is merely exemplary. For example, a division of a unit is merely a logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separated, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the essence of the technical solutions of the present disclosure, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the disclosure. The foregoing storage medium includes any medium that may store a program code, such as a Universal Serial Bus (USB) flash drive, a removable hard disk, a ROM, a RAM, a magnetic disk, or an optical disc.

The aforementioned are merely specific implementations of the present disclosure, but the scope of the present disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

Finally, it should be noted, the foregoing embodiments are only used to illustrate the technical solution of the present disclosure, and by no means constitute any limitation of the present disclosure; although detailed description of the present disclosure is provided with reference to the foregoing embodiments, it should be appreciated that modifications to the technical solution set forth in the embodiments or equivalent replacements of a part or all of technical features in the technical solution may be made by one of ordinary skill in the art, and these modifications or replacements will not make essences of corresponding technical solutions to depart from the scope of the technical solutions of the embodiments of the present disclosure.

What is claimed is:

1. A beam failure recovery processing method, the method being applied to a terminal and comprising:
   triggering a beam failure recovery; and
   determining whether the beam failure recovery succeeds or not;
   wherein the triggering the beam failure recovery comprises:
   triggering, by a higher layer of the terminal, the beam failure recovery; and
   transmitting, by the higher layer of the terminal, second indication information to a physical layer of the terminal, wherein the second indication information is configured to indicate that the beam failure recovery is triggered by the higher layer of the terminal;
   wherein triggering, by the higher layer of the terminal, the beam failure recovery comprises:
   measuring, by the physical layer of the terminal, a quality of a beam pair link (BPL) employed in a current information transmission for at least one time; and
   in a case that the physical layer of the terminal determines that a result of the at-least-one-time measurement is lower than or equal to a preset reference threshold, transmitting, by the physical layer of the terminal, third indication information to the higher layer of the terminal, to enable the higher layer of the terminal to trigger the beam failure recovery according to the third indication information.

2. The method according to claim 1, wherein after triggering, by the higher layer of the terminal, the beam failure recovery, the method further comprises:

starting, by the higher layer of the terminal, at least one of a timer and a first counter related to beam failure recovery;

wherein the first counter is configured to count the number of times of failure response indication information, and a threshold of the first counter is the first preset number of times.

3. The method according to claim 2, wherein determining whether the beam failure recovery succeeds or not comprises:

in a case that the higher layer of the terminal fails to receive success response indication information corresponding to a beam failure recovery request until the timer related to beam failure recovery expires, determining, by the higher layer of the terminal, failure of the beam failure recovery.

4. The method according to claim 3, wherein after determining, by the higher layer of the terminal, failure of the beam failure recovery, the method further comprises:

declaring, by the higher layer of the terminal, a radio link failure (RLF);

or, after determining, by the higher layer of the terminal, the failure of the beam failure recovery, the method further comprises:

transmitting, by the higher layer of the terminal, first notification information to the physical layer of the terminal, wherein the first notification information is configured to indicate the failure of the beam failure recovery.

5. The method according to claim 4, wherein after declaring, by the higher layer of the terminal, the RLF, the method further comprises:

transmitting, by the higher layer of the terminal, second notification information to the physical layer of the terminal, wherein the second notification information is configured to indicate that the higher layer of the terminal declares the RLF.

6. The method according to claim 2, wherein determining whether the beam failure recovery succeeds or not comprises:

in a case that the number of times that failure response indication information corresponding to the beam failure recovery request is received by the higher layer of the terminal reaches the first preset number of times, determining, by the higher layer of the terminal, failure of the beam failure recovery.

7. The method according to claim 6, wherein after determining, by the higher layer of the terminal, the failure of the beam failure recovery, the method further comprises:

declaring, by the higher layer of the terminal, a radio link failure (RLF).

8. The method according to claim 2, further comprising:

in a case that the higher layer of the terminal receives success response indication information corresponding to a beam failure recovery request during operation of the at least one of the timer and the first counter related to beam failure recovery, stopping, by the higher layer of the terminal, the at least one of the timer and the first counter related to beam failure recovery.

9. The method according to claim 2, wherein after starting, by the higher layer of the terminal, the at least one of the timer and the first counter related to beam failure recovery, the method further comprises:

suspending or pausing, by the higher layer of the terminal, a timer related to RLF monitoring, or stopping, by the higher layer of the terminal, the timer related to RLF monitoring.

10. The method according to claim 9, wherein the timer related to RLF monitoring comprises at least one of a RLF-related timer and a radio link monitoring (RLM)-related timer.

11. The method according to claim 1, wherein determining whether the beam failure recovery succeeds or not comprises:

in a case that the physical layer of the terminal receives the second preset number of failure responses corresponding to a beam failure recovery request, transmitting, by the physical layer of the terminal, beam failure recovery failure indication information to the higher layer of the terminal; and determining, by the higher layer of the terminal, failure of the beam failure recovery;

wherein the beam failure recovery failure indication information is configured to indicate that the physical layer of the terminal receives the second preset number of failure responses corresponding to the beam failure recovery request;

or, determining whether the beam failure recovery succeeds or not comprises:

in a case that the higher layer of the terminal receives success response indication information corresponding to a beam failure recovery request, determining, by the higher layer of the terminal, success of the beam failure recovery.

12. The method according to claim 11, wherein after determining, by the higher layer of the terminal, the failure of the beam failure recovery, the method further comprises:

transmitting, by the higher layer of the terminal, first notification information to the physical layer of the terminal, wherein the first notification information is configured to indicate the failure of the beam failure recovery;

or, after determining, by the higher layer of the terminal, the failure of the beam failure recovery, the method further comprises:

declaring, by the higher layer of the terminal, a radio link failure (RLF).

13. The method according to claim 11, wherein after determining, by the higher layer of the terminal, the success of the beam failure recovery, the method further comprises:

transmitting, by the higher layer of the terminal, third notification information to the physical layer of the terminal, wherein the third notification information is configured to indicate the success of the beam failure recovery.

14. The method according to claim 11, wherein receiving, by the higher layer of the terminal, the success response indication information corresponding to the beam failure recovery request comprises:

receiving, by the higher layer of the terminal, the success response indication information reported by the physical layer of the terminal; or acquiring, by the higher layer of the terminal, the success response indication information in accordance with a higher-layer signaling transmitted by a network-side device to the terminal, wherein the success response indication information carries an acknowledgement response corresponding to the beam failure recovery request.

15. The method according to claim 1, wherein after determining whether the beam failure recovery succeeds or not, the method further comprises:
   determining, by the higher layer of the terminal in accordance with a status of the beam failure recovery, whether to perform a radio link failure (RLF) monitoring process or not.

16. A terminal, comprising:
   a processor, and
   a storage connected to the processor via a bus interface and configured to store a program and data,
   wherein the processor is configured to call the program and the data stored in the storage, to implement the method according to claim 1.

17. A non-volatile computer readable storage medium, comprising:
   instructions stored on the non-volatile computer readable storage medium, wherein when the instructions are executed by a computer, the computer implements the method according to claim 1.

* * * * *